(12) United States Patent
Yoshida et al.

(10) Patent No.: US 12,365,806 B2
(45) Date of Patent: Jul. 22, 2025

(54) FINE METAL PARTICLE DISPERSION PRODUCTION METHOD

(71) Applicant: KAO CORPORATION, Tokyo (JP)

(72) Inventors: Tomohide Yoshida, Wakayama (JP); Hirotaka Takeno, Wakayama (JP)

(73) Assignee: KAO CORPORATION, Tokyo (JP)

( * ) Notice: Subject to any disclaimer, the term of this patent is extended or adjusted under 35 U.S.C. 154(b) by 896 days.

(21) Appl. No.: 17/283,758

(22) PCT Filed: Apr. 26, 2019

(86) PCT No.: PCT/JP2019/018018
§ 371 (c)(1),
(2) Date: Apr. 8, 2021

(87) PCT Pub. No.: WO2020/075331
PCT Pub. Date: Apr. 16, 2020

(65) Prior Publication Data
US 2021/0379654 A1 Dec. 9, 2021

(30) Foreign Application Priority Data
Oct. 12, 2018 (JP) ................................ 2018-193636

(51) Int. Cl.
| | | |
|---|---|---|
| *C09D 11/322* | (2014.01) | |
| *B22F 1/0545* | (2022.01) | |
| *B22F 1/10* | (2022.01) | |
| *B22F 9/20* | (2006.01) | |
| *B22F 9/24* | (2006.01) | |
| *B82Y 30/00* | (2011.01) | |
| *C08K 5/053* | (2006.01) | |
| *C08L 29/04* | (2006.01) | |
| *C09D 11/30* | (2014.01) | |
| *C09D 11/52* | (2014.01) | |
| *G06K 19/077* | (2006.01) | |
| *H01B 1/20* | (2006.01) | |

(52) U.S. Cl.
CPC .......... *C09D 11/322* (2013.01); *B22F 1/0545* (2022.01); *B22F 1/10* (2022.01); *B22F 9/20* (2013.01); *B22F 9/24* (2013.01); *C08K 5/053* (2013.01); *C08L 29/04* (2013.01); *C09D 11/30* (2013.01); *C09D 11/52* (2013.01); *B22F 2302/25* (2013.01); *B82Y 30/00* (2013.01); *G06K 19/07773* (2013.01); *H01B 1/20* (2013.01)

(58) Field of Classification Search
CPC .................................. B22F 1/0545; B22F 9/24
See application file for complete search history.

(56) References Cited

U.S. PATENT DOCUMENTS

| | | | | |
|---|---|---|---|---|
| 2007/0290175 A1* | 12/2007 | Kim | ........................ | B22F 9/24 252/500 |
| 2008/0087137 A1* | 4/2008 | Shim | ..................... | B82Y 30/00 75/331 |
| 2010/0113647 A1* | 5/2010 | Harada | ..................... | C09C 3/10 977/773 |
| 2010/0120960 A1 | 5/2010 | Lee et al. | | |
| 2011/0180764 A1 | 7/2011 | Takahashi et al. | | |
| 2011/0247866 A1 | 10/2011 | Kim et al. | | |
| 2012/0267151 A1* | 10/2012 | Hojo | ..................... | C23C 16/455 427/535 |
| 2013/0205950 A1* | 8/2013 | Jurk | ......................... | C22C 5/04 75/371 |
| 2015/0166810 A1* | 6/2015 | Fu | ............................. | B22F 9/24 252/514 |
| 2015/0252157 A1* | 9/2015 | Ogura | .................... | C08F 265/06 524/401 |
| 2015/0368483 A1* | 12/2015 | Bollen | ................. | C09D 11/037 252/514 |
| 2016/0082516 A1* | 3/2016 | Loccufier | ................. | C09D 5/24 252/514 |
| 2016/0137855 A1 | 5/2016 | Tsuyama et al. | | |
| 2017/0013711 A1 | 1/2017 | Hojo et al. | | |
| 2017/0118836 A1* | 4/2017 | Kim | ....................... | H01B 1/22 |
| 2017/0342279 A1 | 11/2017 | Kawamura et al. | | |
| 2018/0171159 A1* | 6/2018 | Ooi | ........................ | B22F 1/102 |

FOREIGN PATENT DOCUMENTS

| | | |
|---|---|---|
| CN | 1903946 A | 1/2007 |
| CN | 101678460 A | 3/2010 |
| CN | 102066024 A | 5/2011 |
| CN | 102326213 A | 1/2012 |
| CN | 102596455 A | 7/2012 |
| CN | 103408896 A | 11/2013 |
| CN | 105164183 A | 12/2015 |
| CN | 105358640 A | 2/2016 |
| CN | 105873986 A | 8/2016 |
| CN | 201629165 4 | 8/2016 |
| CN | 108504185 A | 9/2018 |
| JP | 2006-169557 A | 6/2006 |

(Continued)

OTHER PUBLICATIONS

International Search Report issued on Jul. 30, 2019 in PCT/JP2019/018018 filed on Apr. 26, 2019, 1 page.

(Continued)

*Primary Examiner* — Alexandra M Moore
*Assistant Examiner* — Austin Pollock
(74) *Attorney, Agent, or Firm* — Oblon, McClelland, Maier & Neustadt, L.L.P.

(57) ABSTRACT

The present invention relates to [1] a process for producing a metal fine particle dispersion containing metal fine particles (a) dispersed with a polymer B, including the step 1 of mixing a metal oxide A, the polymer B and a compound C with each other, in which the polymer B contains a hydrophilic group; the compound C is a dihydric alcohol represented by the general formula (1); and the metal fine particles (a) have a cumulant average particle size of not more than 50 nm, and [2] an ink containing the metal line particle dispersion obtained by the production process described in the above [1].

13 Claims, No Drawings

(56) References Cited

FOREIGN PATENT DOCUMENTS

| | | | |
|---|---|---|---|
| JP | 2008138286 A * | 6/2008 | .......... B01F 17/0007 |
| JP | 2010-269516 A | 12/2010 | |
| JP | 2010-285695 A | 12/2010 | |
| JP | 2011-12290 A | 1/2011 | |
| JP | 2014047413 A * | 3/2014 | |
| JP | 2016-23348 A | 2/2016 | |
| JP | 2016-141854 A | 8/2016 | |
| JP | 2017-2219 A | 1/2017 | |
| JP | 2019026652 A * | 2/2019 | |
| WO | WO 2010/067949 A1 | 6/2010 | |
| WO | WO 2011/040521 A1 | 4/2011 | |
| WO | WO 2014/0172856 | 10/2014 | |
| WO | WO 2015/081532 A1 | 6/2015 | |
| WO | WO-2019131435 A1 * | 7/2019 | ................ B22F 9/24 |

OTHER PUBLICATIONS

Hayashi, Y. et al., "Various Applications of Silver Nano-particles by Ultrasonic Eco-fabrication," Materials Science Forum, vols. 486-487, 2005, pp. 530-533.

Yonezawa, T. et al., "Particle size tuning in scalable synthesis of anti-oxidized copper fine particles by polypeptide molecular weights," Advanced Powder Technology, vol. 28, 2017, pp. 1966-1971.

Extended European Search Report issued Jun. 7, 2022 in European Patent Application No. 19871424.8, 6 pages.

* cited by examiner

FINE METAL PARTICLE DISPERSION PRODUCTION METHOD

FIELD OF THE INVENTION

The present invention relates to a process for producing a metal fine particle dispersion and an ink containing the metal fine particle dispersion.

BACKGROUND OF THE INVENTION

Metal fine particles obtained by atomizing a metal into fine particles having a nano order size are capable of exhibiting a variety of functions and properties upon use thereof, and it has been therefore expected that the metal fine particles are used in a wide variety of industrial applications.

In order to promote use of the metal fine particles in the industrial applications, various methods for production of the metal fine particles have been conventionally studied. For example, as the chemical methods for producing metal atoms, there are known wet methods such as the method in which metal ions eluted from a metal compound are subjected to reduction reaction in a liquid, the method in which a metal atom is retrieved from a metal complex by thermal decomposition of the metal complex, and the like. However, in the method using the metal complex, it has been required to conduct the heat treatment under high temperature conditions, and a reducing liquid used for reducing the metal complex poses the problem concerning removal of residual organic substances, etc. Therefore, studies on processes for production of the metal fine particles which have high industrial practicality have been made conventionally.

For example, JP 2017-2219A (Patent Literature 1) aims at providing a composition solution for forming a silver mirror film layer from which the silver mirror film layer can be produced without heating under ordinary temperature conditions for a short period of time, and which is free of occurrence of harmful components or corrosive by-products, etc., and discloses a composition solution for forming a silver mirror film layer which is formed of a dispersion solution of silver nanoparticles, the composition solution being produced by irradiating an ultrasonic wave to an alcohol solution that is prepared by dissolving a polymer dispersant in an alcohol solvent and dispersing at least one silver compound selected from silver oxide and silver carbonate in the resulting solution, etc.

JP 2010-285695A (Patent Literature 2) aims at providing silver fine particles that have an average particle size of not more than 30 nm and exhibit high uniformity of their particle sizes, etc., and discloses silver fine particles that are obtained by adding 1 to 15% by mass of a silver compound having an average particle size of not more than 10 μm, and a water-soluble polymer as a dispersant in an amount of 5 to 80% by mass on the basis of a content of silver in the silver compound, to a polyol solvent, and then subjecting the resulting solution to heat-reduction reaction at a temperature of not higher than 100° C., etc.

SUMMARY OF THE INVENTION

The present invention relates to a process for producing a metal fine particle dispersion containing metal fine particles (a) dispersed with a polymer B, including the step 1 of mixing a metal oxide A, the polymer B and a compound C with each other, in which:

the polymer B contains a hydrophilic group;
the compound C is a dihydric alcohol represented by the following general formula (1); and
the metal fine particles (a) have a cumulant average particle size of not more than 50 nm,

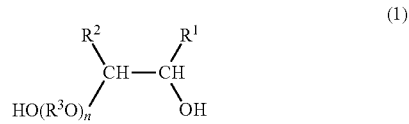

(1)

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), in the case where $R^1$ and $R^2$ both are a hydrogen atom, $R^3$ contains at least a propylene group, and n is not less than 1.

DETAILED DESCRIPTION OF THE INVENTION

However, the technologies described in the Patent Literature 1 are concerned with a method for reducing a silver compound by irradiating an ultrasonic wave to the silver compound without particularly adding a reducing agent thereto. In addition, in the technologies described in the Patent Literature 2, although ethylene glycol, diethylene glycol or triethylene glycol is used as the polyol solvent to obtain the metal fine particles, there arises such a problem that the metal fine particles are flocculated together so that a large amount of coarse particles are included therein. The functions and properties of the metal fine particles tend to largely vary depending upon a particle size thereof, and therefore coarse metal fine particles having a particle size of more than 100 nm tend to cause deterioration in the functions and properties of the metal fine particles if included therein. In addition, as the particle sizes of the metal fine particles are increased, the velocity of precipitation of the metal fine particles becomes larger, so that the metal fine particles tend to be deteriorated in dispersion stability. For this reason, it has been demanded to provide a process for producing a metal fine particle dispersion in which formation of coarse metal fine particles having a particle size of more than 100 nm is inhibited.

The present invention relates to a process for producing a metal fine particle dispersion having a high content of metal fine particles having a particle size of not more than 100 nm, and an ink containing the metal fine particle dispersion.

The present inventors have noticed that when conducting the process including the step of mixing a metal oxide, a polymer and a dihydric alcohol represented by the specific general formula with each other in which the polymer contains a hydrophilic group, and a cumulant average particle size of metal fine particles dispersed with the polymer is controlled to not more than 50 nm, it is possible to improve dispersion stability of the metal fine particles and enhance a content of the metal fine particles having a particle size of not more than 100 nm, and the present inventors have found that in such a case, it is possible obtain a metal fine particle dispersion having a high content of the metal fine particles having a particle size of not more than 100 nm.

That is, the present invention relates to the following aspects [1] to [6].

[1] A process for producing a metal fine particle dispersion containing metal fine particles (a) dispersed with a polymer B, including the step 1 of mixing a metal oxide A, the polymer B and a compound C with each other, in which:

the polymer B contains a hydrophilic group;

the compound C is a dihydric alcohol represented by the following general formula (1); and the metal fine particles (a) have a cumulant average particle size of not more than 50 nm,

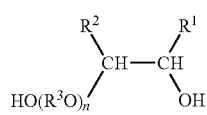
(1)

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), in the case where $R^1$ and $R^2$ both are a hydrogen atom, $R^3$ contains at least a propylene group, and n is not less than 1.

[2] An ink containing the metal fine particle dispersion obtained by the production process according to the above aspect [1].

[3] A process for producing a printed material, including the step of applying the ink according to the above aspect [2] onto a printing medium to obtain the printed material on which a metal film is formed.

[4] An antenna for RFID tag, which is produced from the ink according to the above aspect [2].

[5] An RFID tag containing the antenna for RFID tag according to the above aspect [4].

[6] A multi-layer ceramic capacitor containing an internal electrode layer that is produced from the ink according to the above aspect [2].

In accordance with the present invention, it is possible to provide a process for producing a metal fine particle dispersion having a high content of metal fine particles having a particle size of not more than 100 nm, and an ink containing the metal fine particle dispersion.

[Process for Producing Metal Fine Particle Dispersion]

The process for producing a metal fine particle dispersion according to the present invention is a process for producing a metal fine particle dispersion containing metal fine particles (a) dispersed with a polymer B (hereinafter also referred to merely as "metal fine particles (a)") (such a dispersion is hereinafter also referred to merely as a "metal fine particle dispersion"), the process including the step 1 of mixing a metal oxide A, the polymer B and a compound C with each other (hereinafter also referred to merely as the "step 1"), in which the polymer B contains a hydrophilic group, preferably a carboxy group; the compound C is a dihydric alcohol represented by the following general formula (1); and the metal fine particles (a) have a cumulant average particle size of not more than 50 nm,

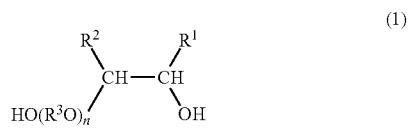
(1)

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), in the case where $R^1$ and $R^2$ both are a hydrogen atom, $R^3$ contains at least a propylene group, and n is not less than 1.

The metal fine particle dispersion obtained by the production process of the present invention is a dispersion formed by dispersing the metal fine particles (a) in a medium. In this case, the configuration of the metal fine particles (a) is not particularly limited, and the metal fine particles (a) may have any configuration as long as the particles are formed of at least metal fine particles and the polymer B. Examples of the configuration of the metal fine particles (a) include the particle configuration in which the metal fine particles are enclosed in the polymer B, the particle configuration in which the metal fine particles are uniformly dispersed in the polymer B, the particle configuration in which the metal fine particles are exposed onto a surface of respective particles of the polymer B, etc., as well as a mixture of these particle configurations.

According to the present invention, it is possible to obtain a metal fine particle dispersion that has a high content of metal fine particles having a particle size of not more than 100 nm. The reason why the aforementioned advantageous effect can be attained by the present invention is considered as follows, though it is not clearly determined yet.

That is, in the present invention, since the metal oxide is used as a metal raw material compound, it is possible to conduct reduction reaction of the metal oxide under the condition that no counter ions acting as a flocculant are allowed to coexist. In addition, it is considered that in the present invention, since the dihydric alcohol used herein is represented by the specific general formula, the alcohol can exhibit excellent hydrophile lipophile balance, and the metal ions can be efficiently and gradually retrieved from the metal oxide probably owing to chelating effect of the alcohol, which will also contribute to stability of the metal ions thus retrieved. Furthermore, since the polymer having a function as the dispersant contains a hydrophilic group, the polymer can be adsorbed or coordinated to the metal ions to thereby improve stability of the metal ions. These effects synergistically act in the course of formation of the metal fine particles, so that excessive flocculation of the metal ions is suppressed, and formation of coarse metal fine particles is inhibited. As a result, it is considered that it is possible to obtain the metal fine particle dispersion having a high content of metal fine particles.

(Step 1)

The step 1 is the step of mixing the metal oxide A, the polymer B and the compound C with each other. In the step 1, it is considered that the metal oxide A is reduced with the compound C to form the metal fine particles (a) dispersed with the polymer B.

In the step 1, the metal oxide A, the polymer B and the compound C may be mixed with each other by conventionally known methods.

The temperature used upon the mixing is preferably not lower than 20° C., more preferably not lower than 25° C., even more preferably not lower than 30° C. and further even more preferably not lower than 35° C., and is also preferably not higher than 100° C., more preferably not higher than 95° C. and even more preferably not higher than 90° C., from the viewpoint of enhancing a content of the metal fine particles.

<Metal Oxide A>

Examples of the metal (metal atom) contained in the metal oxide A (hereinafter also referred to merely as an "oxide A") include Group 4 transition metals such as titanium, zirconium, etc.; Group 5 transition metals such as vanadium, niobium, etc.; Group 6 transition metals such as chromium, molybdenum, tungsten, etc.; Group 7 transition metals such as manganese, technetium, rhenium, etc.; Group 8 transition metals such as iron, ruthenium, etc.; Group 9 transition metals such as cobalt, rhodium, iridium, etc.; Group 10 transition metals such as nickel, palladium, platinum, etc.; Group 11 transition metals such as copper, silver, gold, etc.; Group 12 transition metals such as zinc, cadmium, etc.; Group 13 transition metals such as aluminum, gallium, indium, etc.; Group 14 transition metals such as germanium, tin, lead, etc.; and the like. As the aforementioned metal, a kind of metal may be used alone as a single metal, or two or more kinds of metals may be used in combination with each other in the form of an alloy. In addition, as the oxide A, a kind of oxide may be used alone, or two or more kinds of oxides may be used in the form of a mixture thereof.

Among these metal oxides, preferred are oxides of transition metals belonging to Groups 4 to 11 in the 4th to 6th Periods of the Periodic Table, more preferred are oxides of copper or noble metals such as gold, silver, platinum, palladium, etc., even more preferred is an oxide of at least one metal selected from the group consisting of gold, silver, copper and palladium, further even more preferred is at least one oxide selected from the group consisting of gold oxide, silver oxide and copper oxide, and still further even more preferred is at least one oxide selected from the group consisting of silver oxide and copper oxide.

The volume median particle size $D_{50}$ (hereinafter also referred to merely as "$D_{50}$") of the oxide A is preferably not less than 0.1 µm, more preferably not less than 0.5 µm, even more preferably not less than 1 µm and further even more preferably not less than 3 µm, and is also preferably not more than 30 µm, more preferably not more than 20 µm and even more preferably not more than 15 µm, from the viewpoint of accelerating the reduction reaction and enhancing a content of the metal fine particles. The volume median particle size $D_{50}$ of the oxide A may be measured by the method described in Examples below.

The oxide A is preferably subjected to pulverization treatment so as to control the volume median particle size $D_{50}$ thereof to the aforementioned range. The pulverization treatment is preferably dry pulverization treatment, and more preferably conducted using a media disperser such as a paint shaker, a beads mill, etc.

Examples of a material of dispersing media particles used in the media disperser include ceramic materials such as zirconia, titania, etc.; polymer materials such as polyethylene, nylon, etc.; metals; and the like. Of these materials, from the viewpoint of attaining good abrasion resistance, preferred is zirconia. The diameter of the respective dispersing media particles is preferably not more than 5 mm and more preferably not more than 3 mm from the viewpoint of preventing occurrence of excessive damage to the metal oxide, and is also preferably not less than 0.1 mm, more preferably not less than 0.5 mm and even more preferably not less than 0.7 mm from the viewpoint of improving pulverization efficiency.

The rotating speed of the media disperser is preferably not less than 50 rpm, more preferably not less than 100 rpm and even more preferably not less than 150 rpm, and is also preferably not more than 1,000 rpm, more preferably not more than 500 rpm and even more preferably not more than 300 rpm, from the viewpoint of improving production efficiency.

The temperature used upon the pulverization treatment is preferably not lower than 0° C. and more preferably not lower than 20° C., and is also preferably not higher than 40° C., more preferably not higher than 35° C., even more preferably not higher than 30° C. and further even more preferably not higher than 25° C.

The time of the pulverization treatment is preferably not less than 0.5 hour and more preferably not less than 1 hour, and is also preferably not more than 24 hours, more preferably not more than 12 hours and even more preferably not more than 6 hours.

<Polymer B>

The polymer B used in the present invention contains a hydrophilic group, and has a function as a dispersant for the metal fine particles. Examples of the hydrophilic group include anionic groups, e.g., groups that are capable of releasing hydrogen ions upon dissociation thereof to allow the polymer to exhibit acidity, such as a carboxy group (—COOM), a sulfonic acid group (—SO$_3$M), a phosphoric acid group (—OPO$_3$M$_2$), etc., or dissociated ion forms of these groups (such as —COO$^-$, —SO$_3^-$, —OPO$_3^{2-}$ and —OPO$_3^-$M), etc.; nonionic groups such as a hydroxy group, an amide group, an oxyalkylene group, etc.; cationic groups such as protonic acid salts of a primary, secondary or tertiary amino group, a quaternary ammonium group, etc.; and the like. In the aforementioned chemical formulae, M represents a hydrogen atom, an alkali metal, ammonium or an organic ammonium.

The polymer B is preferably at least one polymer selected from the group consisting of a nonionic polymer containing a nonionic group and an anionic polymer containing an anionic group from the viewpoint of enhancing a content of the metal fine particles.

Examples of the nonionic polymer include a polymer having a structure derived from vinyl pyrrolidone, such as polyvinyl pyrrolidone, etc., a polymer having a structure derived from acrylamide, such as polyacrylamide, etc., polyvinyl alcohol, a polymer containing a polyethyleneoxide chain, and the like.

The anionic polymer is preferably in the form of a carboxy group-containing polymer. As the basic structure of the carboxy group-containing polymer, there may be mentioned condensation-based polymers such as polyesters, polyurethanes, etc.; vinyl-based polymers such as acrylic resins, styrene-based resins, styrene-acrylic resins, acrylic silicone-based resins, etc.; and the like.

The carboxy group contained in a molecule of the polymer B is preferably introduced into a polymer skeleton thereof by a carboxy group-containing monomer (b-1). That is, the polymer B preferably contains a constitutional unit derived from the carboxy group-containing monomer (b-1) from the viewpoint of enhancing a content of the metal fine particles. Among these polymers, from the viewpoint of enhancing a content of the metal fine particles, preferred is a vinyl-based polymer (b) that contains the constitutional unit derived from the carboxy group-containing monomer (b-1) (hereinafter also referred to merely as a "monomer (b-1)"), a constitutional unit derived from a hydrophobic monomer (b-2) (hereinafter also referred to merely as a "monomer (b-2)") and a constitutional unit derived from a polyalkylene glycol segment-containing monomer (b-3) (hereinafter also referred to merely as a "monomer (b-3)") (such a vinyl-based polymer (b) is hereinafter also referred to merely as a "polymer (b)"). The polymer (b) may be produced by copolymerizing a raw material monomer containing the monomer (b-1), the monomer (b-2) and the monomer (b-3) (hereinafter also referred to merely as a "raw material monomer"). The polymer (b) may be in the form of any of a block copolymer, a random copolymer and an alternating copolymer.

[Carboxy Group-Containing Monomer (b-1)]

The carboxy group contained in the monomer (b-1) is the same as described above.

Specific examples of the monomer (b-1) include unsaturated monocarboxylic acids such as (meth)acrylic acid, crotonic acid, 2-methacryloyloxymethylsuccinic acid, etc.; unsaturated dicarboxylic acids such as maleic acid, itaconic acid, fumaric acid, citraconic acid, etc.; and the like. Incidentally, the aforementioned unsaturated dicarboxylic acids may be in the form of anhydrides thereof.

These monomers (b-1) may be used alone or in combination of any two or more thereof.

The monomer (b-1) is preferably at least one monomer selected from the group consisting of (meth)acrylic acid and maleic acid from the viewpoint of enhancing a content of the metal line particles.

The term "(meth)acrylic acid" as used in the present invention means at least one compound selected from the group consisting of acrylic acid and methacrylic acid, and the "(meth)acrylic acid" is hereinlater also defined in the same way.

[Hydrophobic Monomer (b-2)]

The monomer (b-2) is used as a monomer component of the polymer (b) from the viewpoint of enhancing a content of the metal fine particles.

The term "hydrophobic" of the hydrophobic monomer as used in the present invention means that a solubility in water of the monomer as measured by dissolving the monomer in 100 g of ion-exchanged water at 25° C. until reaching a saturation concentration thereof is less than 10 g. The solubility in water of the monomer (b-2) is preferably not more than 5 g and more preferably not more than 1 g from the viewpoint of enhancing a content of the metal fine particles.

The monomer (b-2) is preferably at least one monomer selected from the group consisting of an aromatic group-containing monomer and a (meth)acrylate containing a hydrocarbon group derived from an aliphatic alcohol.

The term "(meth)acrylate" as used in the present invention means at least one compound selected from the group consisting of an acrylate and a methacrylate, and the "(meth) acrylate" is hereinafter also defined in the same way.

The aromatic group-containing monomer is preferably a vinyl monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate. The molecular weight of the aromatic group containing monomer is preferably less than 500.

Examples of the styrene-based monomer include styrene, α-methyl styrene, 2-methyl styrene, 4-vinyl toluene (4-methyl styrene), divinyl benzene and the like. Among these styrene-based monomers, preferred are styrene and α-methyl styrene.

As the aromatic group containing (meth)acrylate, preferred are phenyl (meth)acrylate, benzyl (meth)acrylate, phenoxyethyl (meth)acrylate, etc., and more preferred is benzyl (meth)acrylate.

As the (meth)acrylate containing a hydrocarbon group derived from an aliphatic alcohol, preferred are those (meth) acrylates containing a hydrocarbon group derived from an aliphatic alcohol having not less than 1 and not more than 22 carbon atoms. Examples of the (meth)acrylates containing a hydrocarbon group derived from an aliphatic alcohol having not less than 1 and not more than 22 carbon atoms include (meth)acrylates containing a linear alkyl group, such as methyl (meth)acrylate, ethyl (meth)acrylate, propyl (meth) acrylate, butyl (meth)acrylate, pentyl (meth)acrylate, octyl (meth)acrylate, decyl (meth)acrylate, dodecyl (meth)acrylate, stearyl (meth)acrylate, etc.; (meth)acrylates containing a branched alkyl group, such as isopropyl (meth)acrylate, isobutyl (meth)acrylate, tertbutyl (meth)acrylate, isopentyl (meth)acrylate, isooctyl (meth)acrylate, isodecyl (meth) acrylate, isododecyl (meth)acrylate, isostearyl (meth)acrylate, 2-ethylhexyl (meth)acrylate, etc.; (meth)acrylates containing an alicyclic alkyl group, such as cyclohexyl (meth) acrylate, etc.; and the like. Of these (meth)acrylates, more preferred are those (meth)acrylates containing an alkyl group having not less than 6 and not more than 10 carbon atoms.

These monomers (b-2) may be used alone or in combination of any two or more thereof.

As the monomer (b-2), from the viewpoint of enhancing a content of the metal fine particles, preferred is the aromatic group-containing monomer, more preferred is the styrene-based monomer, even more preferred is at least one monomer selected from the group consisting of styrene, α-methyl styrene, 2-methyl styrene and 4-vinyl toluene (4-methyl styrene), and further even more preferred is at least one monomer selected from the group consisting of styrene and α-methyl styrene.

[Polyalkylene Glycol Segment-Containing Monomer (b-3)]

The monomer (b-3) is used as a monomer component of the polymer (b) from the viewpoint of enhancing a content of the metal fine particles.

The monomer (b-3) is preferably a monomer that is capable of introducing a polyalkylene glycol segment into the polymer (b) as a side chain of the polymer (b) from the viewpoint of enhancing a content of the metal fine particles. Examples of the monomer (b-3) include a polyalkylene glycol (meth)acrylate, an alkoxy polyalkylene glycol (meth) acrylate, a phenoxy alkylene glycol (meth)acrylate and the like. These monomers (b-3) may be used alone or in combination of any two or more thereof.

As the monomer (b-3), preferred is at least one monomer selected from the group consisting of a polyalkylene glycol (meth)acrylate and an alkoxy polyalkylene glycol (meth) acrylate, and more preferred is an alkoxy polyalkylene glycol (meth)acrylate. The number of carbon atoms in an alkoxy group of the alkoxy polyalkylene glycol (meth) acrylate is preferably not less than 1 and not more than 8, and more preferably not less than 1 and not more than 4.

Examples of the alkoxy polyalkylene glycol (meth)acrylate include methoxy polyalkylene glycol (meth)acrylates, ethoxy polyalkylene glycol (meth)acrylates, propoxy polyalkylene glycol (meth)acrylates, butoxy polyalkylene glycol (meth)acrylates, octoxy polyalkylene glycol (meth)acrylates and the like.

The polyalkylene glycol segment of the monomer (b-3) preferably contains a unit derived from an alkyleneoxide having not less than 2 and not more than 4 carbon atoms. Examples of the alkyleneoxide include ethyleneoxide, propyleneoxide, butyleneoxide and the like.

The number of the units derived from the alkyleneoxide in the aforementioned polyalkylene glycol segment is preferably not less than 2, more preferably not less than 5 and even more preferably not less than 10, and is also preferably not more than 100, more preferably not more than 70 and even more preferably not more than 50.

The aforementioned polyalkylene glycol segment is preferably a copolymer containing a unit derived from ethyleneoxide and a unit derived from propyleneoxide from the viewpoint of enhancing a content of the metal fine particles. The molar ratio of the ethyleneoxide unit (EO) to the propyleneoxide unit (PO) [EO/PO] is preferably not less than 60/40, more preferably not less than 65/35 and even more preferably not less than 70/30, and is also preferably not more than 90/10, more preferably not more than 85/15 and even more preferably not more than 80/20.

The copolymer containing the unit derived from ethyleneoxide and the unit derived from propyleneoxide may be in the form of any of a block copolymer, a random copolymer and an alternating copolymer.

Specific examples of commercially available products of the monomer (b-3) include "NK ESTER AM-90G", "NK ESTER AM-130G", "NK ESTER AMP-20GY", "NK ESTER AMP-230G", "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400", "BLEMMER PME-1000", "BLEMMER PME-4000" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

(Contents of Respective Monomer Components in Raw Material Monomer or Contents of Respective Constitutional Units in Polymer (b))

The contents of the aforementioned monomers (b-1) to (b-3) in the raw material monomer (contents of non-neutralized components; hereinafter defined in the same way) upon production of the polymer (b), or the contents of the constitutional units derived from the monomers (b-1) to (b-3) in the polymer (b), are as follows, from the viewpoint of enhancing a content of the metal fine particles.

The content of the monomer (b-1) is preferably not less than 5 mol %, more preferably not less than 10 mol % and even more preferably not less than 15 mol %, and is also preferably not more than 40 mol %, more preferably not more than 35 mol % and even more preferably not more than 30 mol %.

The content of the monomer (b-2) is preferably not less than 50 mol %, more preferably not less than 60 mol % and even more preferably not less than 65 mol %, and is also preferably not more than 90 mol %, more preferably not more than 85 mol % and even more preferably not more than 80 mol %.

The content of the monomer (b-3) is preferably not less than 1 mol %, more preferably not less than 5 mol % and even more preferably not less than 7 mol %, and is also preferably not more than 30 mol %, more preferably not more than 20 mol % and even more preferably not more than 15 mol %.

The polymer (b) preferably contains a constitutional unit derived from (meth)acrylic acid or maleic acid as the monomer (b-1), a constitutional unit derived from a styrene-based monomer as the monomer (b-2) and a constitutional unit derived from an alkoxy polyalkylene glycol (meth)acrylate as the monomer (b-3).

As the polymer (b), there may be used either a synthesized product obtained by conventionally known methods or a commercially available product. Examples of the commercially available product of the polymer (b) include "DISPERBYK-190" and "DISPERBYK-2015" available from BYK Chemie GmbH, and the like.

The number-average molecular weight of the polymer B is preferably not less than 1,000, more preferably not less than 2,000 and even more preferably not less than 3,000, and is also preferably not more than 100,000, more preferably not more than 50,000, even more preferably not more than 30,000, further even more preferably not more than 10,000 and still further even more preferably not more than 7,000. When the number-average molecular weight of the polymer B lies within the aforementioned range, adsorption of the polymer B onto the metal fine particles is sufficient, so that the metal fine particles can exhibit good dispersion stability in the dispersion. The number-average molecular weight may be measured by the method described in Examples below.

The acid value of the polymer B is preferably not less than 5 mgKOH/g, more preferably not less than 10 mgKOH/g and even more preferably not less than 20 mgKOH/g, and is also preferably not more than 200 mgKOH/g, more preferably not more than 100 mgKOH/g, even more preferably not more than 50 mgKOH/g and further even more preferably not more than 30 mgKOH/g.

The acid value of the polymer B may be measured by the method described in Examples below.

<Compound C>

The compound C is a dihydric alcohol represented by the following general formula (1). In the present invention, the compound C has not only a function as a reducing agent for the metal oxide A, but also a function as a dispersing medium for the metal fine particle dispersion.

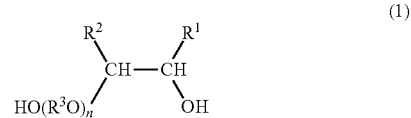

(1)

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), in the case where $R^1$ and $R^2$ both are a hydrogen atom, $R^3$ contains at least a propylene group, and n is not less than 1.

In the aforementioned general formula (1), $R^1$ and $R^2$ may be the same or different from each other. It is preferred that one of $R^1$ and $R^2$ is a hydrogen atom, and the other is a hydrocarbon group having not less than 1 and not more than 3 carbon atoms, it is more preferred that one of $R^1$ and $R^2$ is a hydrogen atom, and the other is methyl group, and it is even more preferred that $R^1$ is a methyl group, and $R^2$ is a hydrogen atom.

In the aforementioned general formula (1), $R^3$ is at least one alkylene group selected from the group consisting of an ethylene group and a propylene group, and preferably a propylene group. In the case where $R^1$ and $R^2$ both are a hydrogen atom, $R^3$ contains at least a propylene group. In the case where $R^3$ is a propylene group, $R^3$ is preferably a 1,2-propanediyl group represented by —CH(CH$_3$)CH$_2$— or —CH$_2$CH(CH$_3$)—. In addition, in the case where n is not less than 2, a plurality of $R^3$ groups present in a molecule of the dihydric alcohol may be the same or different from each other.

In the aforementioned general formula (1), n represents an average molar number of addition of an oxyalkylene group represented by $R^3O$, and is preferably 0 or not less than 1. In the case where $R^1$ and $R^2$ both are a hydrogen atom, n is not less than 1. In the case where n is not less than 1, n is preferably not more than 20.

The boiling point of the compound C is preferably not lower than 150° C. and more preferably not lower than 170° C., and is also preferably not higher than 250° C., more preferably not higher than 230° C. and even more preferably not higher than 210° C. In the case where two or more dihydric alcohols are used in combination with each other as the compound C, the boiling point of the compound C means a weighted mean value of boiling points of the respective dihydric alcohols which are weighted by contents (% by mass) of the dihydric alcohols.

Examples of the compound C include alkanediols such as 1,2-propanediol (propylene glycol), 1,2-butanediol, 2,3-butanediol, 1,2-pentanediol, etc.; and polyalkylene glycols such as polypropylene glycols, etc.

These compounds C may be used alone or in combination of any two or more thereof.

Among these compounds C, preferred are dihydric alcohols containing a 1,2-propanediyl skeleton, more preferred is at least one compound selected from the group consisting of propylene glycol and polypropylene glycols having a polymerization degree of not less than 2 and not more than 20, and even more preferred is at least one compound selected from the group consisting of propylene glycol and dipropylene glycol.

Meanwhile, commercially available products of the dipropylene glycol are usually in the form of a mixture containing three kinds of isomers including 4-oxa-2,6-heptanediol, 2-(2-hydroxypropoxy)-propan-1-ol and 2-(2-hydroxy-1-methylethoxy)-propan-1-ol. In the present invention, in the case where the dipropylene glycol is used as the compound C, the dipropylene glycol may be a compound containing at least one of these three isomers.

In the step 1, in addition to the compound C acting as a reducing agent, the other reducing agent may be mixed therewith.

As the other reducing agent, there may be used either an organic reducing agent or an inorganic reducing agent.

Examples of the organic reducing agent include alcohols other than the compound C, such as ethylene glycol, diethylene glycol, triethylene glycol, polyethylene glycol, 2-propanol, 1 butanol, 2-methyl-1-propanol, 1-methoxy-2-propanol, etc.; aldehydes such as formaldehyde, acetaldehyde, propionaldehyde, etc.; acids such as ascorbic acid, citric acid, etc., and salts thereof, etc.; amines such as triethylamine, N,N-dimethylaminoethanol, N-methyl diethanolamine, etc.; and the like.

Examples of the inorganic reducing agent include boron hydride salts such as sodium boron hydride, ammonium boron hydride, etc.; aluminum hydride salts such as lithium aluminum hydride, potassium aluminum hydride, etc.; hydrazines such as hydrazine, hydrazine carbonate, etc.; hydrogen gas; and the like.

Incidentally, these reducing agents may be used alone or in combination of any two or more thereof.

Among these reducing agents, preferred are those reducing agents having a function as a dispersing medium for the metal fine particle dispersion, more preferred are the aforementioned alcohols other then the compound C, and even more preferred is ethylene glycol.

<Complexing Agent D>

In the step 1, from the viewpoint of enhancing a content of the metal line particles, it is preferred that a complexing agent D is further mixed in the dispersion. It is considered that the complexing agent D contributes to acceleration of elution of metal ions from the metal oxide, or improvement in dispersion stability of the metal fine particles by formation of a complex with the metal ions to thereby enhance a content of the metal fine particles. Examples of a donor atom of the complexing agent include nitrogen, sulfur, oxygen and the like. These donor atoms may be used in combination of any two or more thereof. These complexing agents D may be used alone or in combination of any two or more thereof.

Specific examples of the complexing agent D include ammonia; ammonium salts such as ammonium chloride, etc.; cyanides such as potassium cyanide, sodium cyanide, etc.; nitrile compounds such as acetonitrile, etc.; amine compounds such as ethylene diamine, diethylenetriamine, triethylenetetramine, piperazine, triethanolamine, hydroxylamine, glycine, hydroxyethyl glycine, propanediamine, etc.; mercaptocarboxylic acids such as 3-mercaptopropionic acid, mercaptosuccinic acid, 2,3-dimercaptosuccinic acid, etc.; sulfurous acid salts such as potassium sulfite, sodium sulfite, etc.; thiosulfuric acid salts such as potassium thiosulfate, sodium thiosulfate, etc.; hydroxycarboxylic acids such as citric acid, tartaric acid, oxalic acid, etc.; aminopolycarboxylic acids such as ethylenediaminetetraacetic acid (EDTA), nitrilotriacetic acid (NTA), iminodiacetic acid (IDA), ethylenediaminediacetic acid (EDDA), etc.; and the like. Among these complexing agents D, preferred is at least one compound selected from the group consisting of ammonia and mercaptocarboxylic acids, and more preferred is ammonia. The ammonia is preferably used in the form of an aqueous solution thereof from the viewpoint of improving handling properties thereof.

<Water-Based Solvent E>

In the step 1, a water-based solvent E may be further mixed in the dispersion. As the water-based solvent E, there may be mentioned water; alcohols other than the compound C, having not more than 4 carbon atoms, such as ethanol, etc.; ketones having not less than 3 and not more than 8 carbon atoms, such as acetone, etc.; ethers such as tetrahydrofuran, etc.; and the like.

The content of water in the water-based solvent E is preferably not less than 60% by mass, more preferably not less than 70% by mass, even more preferably not less than 90% by mass and further even more preferably not less than 95% by mass.

(Amounts of Respective Components Charged)

The amounts of the respective components charged on the basis of a total amount of the oxide A, the polymer B and the compound C charged upon production of the metal fine particle dispersion are as follows from the viewpoint of enhancing a content of the metal fine particles as well as from the viewpoint of enhancing productivity of the dispersion.

The amount of the oxide A charged on the basis of a total amount of the oxide A, the polymer B and the compound C charged is preferably not less than 2% by mass, more preferably not less than 5% by mass and even more preferably not less than 10% by mass, and is also preferably not more than 90% by mass, more preferably not more than 70% by mass, even more preferably not more than 50% by mass and further even more preferably not more than 40% by mass.

The amount of the polymer B charged on the basis of a total amount of the oxide A, the polymer B and the compound C charged is preferably not less than 0.2% by mass, more preferably not less than 0.5% by mass and even more preferably not less than 1% by mass, and is also preferably not more than 10% by mass, more preferably not more than 7% by mass and even more preferably not more than 5% by mass.

The amount of the compound C charged on the basis of a total amount of the oxide A, the polymer B and the compound C charged is preferably not less than 5% by mass, more preferably not less than 25% by mass, even more preferably not less than 40% by mass and further even more preferably not less than 50% by mass, and is also preferably not more than 95% by mass, more preferably not more than 90% by mass and even more preferably not more than 85% by mass.

The mass ratio of the compound C to the oxide A [compound C/oxide A] is preferably not less than 0.05, more preferably not less than 0.5, even more preferably not less than 1 and further even more preferably not less than 2, and is also preferably not more than 45, more preferably not more than 25, even more preferably not more than 15, further even more preferably not more than 10 and still further even more preferably not more than 5, from the viewpoint of improving stability of the metal ions as well as from the viewpoint of enhancing a content of the metal fine particles.

In the case where the complexing agent D is further mixed in the step 1, the mass ratio of the complexing agent D to the metal oxide A [complexing agent D/metal oxide A] is preferably not less than 0.01, more preferably not less than 0.03, even more preferably not less than 0.05 and further even more preferably not less than 0.07, and is also preferably not more than 0.5, more preferably not more than 0.4, even more preferably not more than 0.3 and further even more preferably not more than 0.2, from the viewpoint of improving stability of the metal fine particles as well as from the viewpoint of enhancing a content of the metal fine particles.

Examples of the configuration of the polymer B present in the metal fine particle dispersion include the configuration in which the polymer B is adsorbed onto the respective metal fine particles, the configuration in which the metal fine particles are incorporated in the polymer B, i.e., the metal fine particles are enclosed (encapsulated) in the polymer B, and the configuration in which the polymer B is not adsorbed onto the respective metal fine particles. From the viewpoint of improving dispersion stability of the metal fine particles, among these configurations, preferred is the configuration in which the metal fine particles are incorporated in the polymer B, and more preferred is the metal fine particle-enclosing configuration in which the metal fine particles are enclosed in the polymer B.

In the present invention, since the oxide A is used as the metal raw material compound, the resulting metal fine particle dispersion contains no counter ions of the metal ions as impurities. However, in order to remove impurities such as the unreacted reducing agent, a surplus of the polymer B which has no contribution to dispersion of the metal fine particles, etc., the production process of the present invention may further include the step of purifying the metal fine particle dispersion obtained in the step 1.

The method of purifying the metal fine particle dispersion is not particularly limited, and there may be used various methods including membrane treatments such as dialysis, ultrafiltration, etc.; centrifugal separation treatments; and the like. Among these methods, from the viewpoint of efficiently removing the impurities from the dispersion, preferred are the membrane treatments, and more preferred is dialysis. As a material of a dialysis membrane used in the dialysis, there is preferably used a regenerated cellulose.

The molecular weight cutoff of the dialysis membrane is preferably not less than 1,000, more preferably not less than 5,000 and even more preferably not less than 10,000, and is also preferably not more than 100,000 and more preferably not more than 70,000, from the viewpoint of efficiently removing the impurities from the resulting dispersion.

The mass ratio of the polymer B to a sum of the polymer B and the metal [polymer B/(polymer B+metal)] in the metal fine particle dispersion obtained by the production process of the present invention is preferably not less than 0.005, more preferably not less than 0.01, even more preferably not less than 0.03 and further even more preferably not less than 0.05 from the viewpoint of enhancing a content of the metal fine particles, and is also preferably not more than 0.3, more preferably not more than 0.25 and even more preferably not more than 0.2 from the viewpoint of increasing a concentration of the metal fine particles in the dispersion.

The aforementioned mass ratio [polymer B/(polymer B+metal)] is calculated from masses of the polymer B and the metal which may be measured by the method described in Examples below using a differential thermogravimetric simultaneous measurement apparatus (TG/DTA).

The cumulant average particle size of the metal fine particles (a) in the metal fine particle dispersion is preferably not less than 2 nm, more preferably not less than 5 nm, even more preferably not less than 10 nm and further even more preferably not less than 15 nm from the viewpoint of improving dispersion stability of the metal fine particles, and is also not more than 50 nm, preferably not more than 45 nm, more preferably not more than 40 nm and even more preferably not more than 35 nm from the viewpoint of enhancing a content of the metal fine particles.

Incidentally, the aforementioned cumulant average particle size may be measured by the method described in Examples below.

The concentration of the metal in the metal fine particle dispersion is preferably not less than 5% by mass, more preferably not less than 10% by mass, even more preferably not less than 15% by mass and further even more preferably not less than 20% by mass from the viewpoint of facilitating preparation of the below-mentioned ink, and is also preferably not more than 70% by mass, more preferably not more than 50% by mass and even more preferably not more than 30% by mass from the viewpoint of improving dispersion stability of the metal fine particles.

Incidentally, the concentration of the metal in the metal fine particle dispersion may be calculated by the method described in Examples below.

The metal fine particle dispersion of the present invention has a high content of the metal fine particles having a particle size of not more than 100 nm. Therefore, a metal film formed using the metal fine particle dispersion can exhibit excellent properties and functions, so that it is possible to use the metal fine particle dispersion in more extensive applications. Examples of the applications of the metal fine particle dispersion include various inks; conductive materials such as wiring materials, electrode materials, MLCC (multi-layer ceramic capacitor; hereinafter also referred to merely as "MLCC"), etc.; bonding materials such as solders, etc.; various sensors; antennas such as automatic identification technique (RFID: radio frequency identifier; hereinafter also referred to merely as "RFID") tags using short-range radio communication, etc.; catalysts; optical materials; medical materials; and the like.

[Ink]

The ink of the present invention contains the metal fine particle dispersion. Since the metal fine particle dispersion has a high content of the metal fine particles having a particle size of not more than 100 nm, it is possible to reduce irregularities on the surface of a metal film when forming the metal film from the ink. In addition, as the particle size of the metal fine particles is increased, the velocity of precipitation of the metal fine particles becomes larger, so that the resulting ink tends to be deteriorated in storage stability. However, in the ink of the present invention, the formation of coarse metal fine particles having a particle size of more than 100 nm is suppressed, and therefore the ink of the present invention can be improved in storage stability.

Moreover, since the polymer B contains a hydrophilic group, the metal film obtained using the ink can be improved in bending resistance. It is considered that the compound C has high affinity to the metal surface and the polymer B, and therefore after forming an ink coating film using the ink containing the metal fine particle dispersion, the compound C can be uniformly present over a whole surface of the ink coating film, so that the polymer chain is allowed to sufficiently spread thereover. It is considered that when drying the ink coating film under such a condition as described above, the resulting metal film can be improved in bending resistance.

In addition, since the aforementioned ink has a high content of the metal fine particles, necking between the metal fine particles proceeds rapidly, so that it is possible to form a metal film having high conductivity.

The aforementioned ink is preferably in the form of a water-based ink that is prepared by mixing the metal fine particle dispersion with water (hereinafter also referred to merely as a "water-based ink") from the viewpoint of reducing a burden on working environments and natural environments.

The term "water-based ink" as used in the present invention means an ink in which water has a largest content among components of a medium contained in the ink.

The ink preferably contains the aforementioned compound C as an organic solvent. However, from the viewpoint of improving storage stability of the ink, a further organic solvent may be added thereto upon production of the ink. The organic solvent preferably contains one or more organic solvents having a boiling point of not lower than 90° C. The weighted mean value of boiling points of the organic solvents is preferably not lower than 150° C. and more preferably not lower than 180° C., and is also preferably not higher than 240° C., more preferably not higher than 220° C. and even more preferably not higher than 200° C.

Examples of the aforementioned organic solvent include a polyhydric alcohol, a polyhydric alcohol alkyl ether, a nitrogen-containing heterocyclic compound, an amide, an amine, a sulfur-containing compound and the like. Of these organic solvents, preferred is at least one compound selected from the group consisting of a polyhydric alcohol and a polyhydric alcohol alkyl ether, and more preferred is at least one compound selected from the group consisting of ethylene glycol, propylene glycol, diethylene glycol, triethylene glycol, polyethylene glycol, glycerin, trimethylolpropane, diethylene glycol diethyl ether and diethylene glycol monoisobutyl ether.

The aforementioned ink may further contain various additives that may be usually used in inks, such as a fixing assistant such as a dispersion of polymer particles, etc., a humectant, a wetting agent, a penetrant, a surfactant, a viscosity modifier, a defoaming agent, an antiseptic agent, a mildew-proof agent, a rust preventive, etc., if required, and further may be subjected to filtration treatment using a filter, etc. The contents of the respective components in the ink as well as properties of the ink are as follows.

(Contents of Respective Components in Ink)

The content of the metal in the aforementioned ink is preferably not less than 1% by mass, more preferably not less than 3% by mass and even more preferably not less than 5% by mass from the viewpoint of enhancing optical density of the ink as well as from the viewpoint of improving conductivity of the ink, and is also preferably not more than 50% by mass, more preferably not more than 35% by mass, even more preferably not more than 20% by mass, further even more preferably not more than 17% by mass, still further even more preferably not more than 15% by mass, furthermore preferably not more than 13% by mass and still furthermore preferably not more than 11% by mass from the viewpoint of improving bending resistance of the resulting metal film as well as from the viewpoint of reducing viscosity of the ink upon volatilizing the solvent therefrom and improving storage stability of the ink.

The content of the metal in the ink may be measured by the method described in Examples below.

The total content of the metal and the polymer B in the ink is preferably not less than 2% by mass, more preferably not less than 5% by mass and even more preferably not less than 7% by mass from the viewpoint of enhancing optical density of the ink, from the viewpoint of improving conductivity of the ink as well as from the viewpoint of improving bending resistance of the resulting metal film, and is also preferably not more than 55% by mass, more preferably not more than 40% by mass, even more preferably not more than 22% by mass, further even more preferably not more than 20% by mass, still further even more preferably not more than 17% by mass, furthermore preferably not more than 15% by mass and still furthermore preferably not more than 13% by mass from the viewpoint of reducing viscosity of the resulting ink upon volatilizing the solvent therefrom and improving storage stability of the ink.

The total content of the metal and the polymer B in the ink may be calculated from the content of the metal in the ink and the mass ratio [polymer B/(polymer B+metal)] both calculated by the methods described in Examples below.

The content of the organic solvent in the ink is preferably not less than 10% by mass, more preferably not less than 20% by mass and even more preferably not less than 30% by mass, and is also preferably not more than 50% by mass, more preferably not more than 45% by mass and even more preferably not more than 40% by mass, from the viewpoint of improving storage stability of the ink as well as from the viewpoint of improving bending resistance of the resulting metal film.

The content of water in the ink is preferably not less than 20% by mass, more preferably not less than 30% by mass, even more preferably not less than 40% by mass and further even more preferably not less than 50% by mass from the viewpoint of reducing a burden on working environments and natural environments as well as from the viewpoint of improving storage stability of the ink and bending resistance of the resulting metal film, and is also preferably not more than 80% by mass, more preferably not more than 70% by mass and even more preferably not more than 60% by mass from the viewpoint of enhancing optical density of the ink.

The mass ratio of the metal to the whole solid components of the aforementioned ink [metal/(whole solid components of ink)] is preferably not less than 0.3, more preferably not less than 0.5, even more preferably not less than 0.7 and further even more preferably not less than 0.8 from the viewpoint of enhancing optical density and conductivity of the ink, and is also preferably not more than 0.98, more preferably not more than 0.95 and even more preferably not more than 0.9 from the viewpoint of improving storage stability of the ink and bending resistance of the resulting metal film.

(Properties of Ink)

The cumulant average particle size of the metal fine particles (a) in the aforementioned ink is preferably the same as the cumulant average particle size of the metal fine particles in the metal fine particle dispersion, and the preferred range of the cumulant average particle size of the metal fine particles (a) in the ink is also the same as the preferred range of the cumulant average particle size of the metal fine particles in the metal fine particle dispersion.

The viscosity of the aforementioned ink as measured at 32° C. is preferably not less than 2 mPa·s, more preferably not less than 3 mPa·s and even more preferably not less than 5 mPa·s, and is also preferably not more than 12 mPa·s, more preferably not more than 9 mPa·s and even more preferably not more than 7 mPa·s, from the viewpoint of improving storage stability of the resulting ink. The viscosity of the ink may be measured by the method described in Examples below using an E-type viscometer.

The pH value of the aforementioned ink as measured at 20° C. is preferably not less than 7.0, more preferably not less than 7.2 and even more preferably not less than 7.5 from the viewpoint of improving storage stability of the resulting ink, and is also preferably not more than 11, more preferably not more than 10 and even more preferably 9.5 from the viewpoint of improving the resistance of members to the ink and suppressing skin irritation. The pH value of the ink may be measured by the method described in Examples below.

[Ink-Jet Printing Method]

In the present invention, it is possible to obtain a printed material on which a metal film is formed by applying the aforementioned ink onto a printing medium.

The aforementioned ink is capable of not only forming a metal film that has a less number of irregularities on the surface thereof and is excellent in bending resistance, but also exhibiting excellent storage stability, and therefore can be suitably used for metallic printing, in particular, as an ink for flexographic printing, an ink for gravure printing, an ink for screen printing or an ink for ink jet printing. In addition, the aforementioned ink is also capable of forming a metal film that can exhibit high conductivity. In particular, since the aforementioned ink has a high content of the metal fine particles, the ink is more preferably used as an ink for ink-jet printing from the viewpoint of excellent ejection ability thereof. That is, as the method of applying the aforementioned ink onto the printing medium, there is preferably used the ink-jet printing method.

In the case of using the aforementioned ink as an ink for ink-jet printing, the ink may be loaded to a conventionally known ink-jet printing apparatus from which droplets of the ink are ejected onto a printing medium to print characters or images, etc., on the printing medium.

Although the ink-jet printing apparatus may be of either a thermal type or a piezoelectric type, the ink of the present invention is preferably used as an ink for ink jet printing using an ink jet printing apparatus of a piezoelectric type.

Examples of the printing medium used when printing characters or images thereon using the aforementioned ink include a high-water absorbing plain paper, a low-water absorbing coated paper and a non-water absorbing resin film. Specific examples of the coated paper include a versatile glossy coated paper, a multi-color foam glossy coated paper, and the like. Among these printing media, preferred is the resin film from the viewpoint of improving bending resistance of the resulting metal film as well as from the viewpoint of using the metal film capable of exhibiting conductivity in adequate applications. As the resin film, preferred is at least one resin film selected from the group consisting of a polyester film such as a polyethylene terephthalate (PET) film, a polyethylene naphthalate (PEN) film, etc., a polyvinyl chloride film, a polypropylene film and a polyethylene film. As the resin film, there may also be used those substrates subjected to corona treatment.

Examples of generally commercially available products of the resin film include "LUMIRROR T60" (polyester) available from Toray Industries Inc., "TEONEX Q51-A4" (polyethylene naphthalate) available from Teijin Film Solutions Ltd., "PVC80B P" (polyvinyl chloride) available from Lintec Corporation, "DGS-210WH" (polyvinyl chloride) available from Roland DG Corporation, a transparent polyvinyl chloride film "RE-137" (polyvinyl chloride) available from MIMAKI ENGINEERING Co., Ltd., "KINATH KEE 70CA" (polyethylene) available from Lintec Corporation, "YXJPO SG90 PAT1" (polypropylene) available from Lintec Corporation, "FOR" and "FOA" (polypropylene) both available from Futamura Chemical Co, Ltd., "BONYL RX" (nylon) available from Kohjin Film & Chemicals Co., Ltd., "EMBLEM ONBC" (nylon) available from UNITIKA Ltd., and the like.

(Ink-Jet Printing Conditions)

The temperature of the ink jet print head is preferably not lower than 15° C., more preferably not lower than 20° C. and even more preferably not lower than 25° C., and is also preferably not higher than 45° C., more preferably not higher than 40° C. and even more preferably not higher than 35° C., from the viewpoint of improving metallic luster of the resulting metal film as well as from the viewpoint of improving conductivity of the resulting metal film.

The voltage applied to the ink-jet print head is preferably not less than 5 V, more preferably not less than 10 V and even more preferably not less than 15 V, and is also preferably not more than 40 V, more preferably not more than 35 V and even more preferably not more than 30 V, from the viewpoint of improving printing efficiency, etc.

The drive frequency of the print head is preferably not less than 1 kHz, more preferably not less than 5 kHz and even more preferably not less than 10 kHz, and is also preferably not more than 50 kHz, more preferably not more than 40 kHz and even more preferably not more than 35 kHz, from the viewpoint of improving printing efficiency, etc.

The amount of droplets of the ink ejected is preferably not less than 5 pL and more preferably not less than 10 pL, and is also preferably not more than 30 pL and more preferably not more than 25 pL, as calculated per one ink droplet ejected, from the viewpoint of improving metallic luster of the resulting metal film as well as from the viewpoint of improving conductivity of the resulting metal film.

The amount of the ink applied onto the printing medium in terms of a solid content thereof is preferably not less than 0.5 g/m$^2$, more preferably not less than 1 g/m$^2$ and even more preferably not less than 2 g/m$^2$, and is also preferably not more than 20 g/m$^2$, more preferably not more than 15 g/m$^2$ and even more preferably not more than 10 g/m$^2$.

The resolution of images printed by the ink-jet printing is preferably not less than 200 dpi and more preferably not less than 300 dpi, and is also preferably not more than 1,000 dpi, more preferably not more than 800 dpi and even more preferably not more than 600 dpi. Meanwhile, the term "resolution" as used in the present specification means the number of dots per inch (2.54 cm) which are formed on the printing medium. For example, the "resolution of 600 dpi" means that when the ink droplets are ejected onto the printing medium using a line print head on which a nozzle row is arranged such that the number of nozzle ports per a length of the nozzle row corresponds to 600 dpi (dots/inch), a corresponding dot row of 600 dpi is formed in the direction perpendicular to a transporting direction of the printing medium, and further when ejecting the ink droplets while moving the printing medium in the transporting direction thereof, the dot row of 600 dpi per inch is also formed on the printing medium along the transporting direction thereof. In the present specification, it is assumed that the value of the resolution in the direction perpendicular to the transporting direction of the printing medium is the same as the value of the resolution in the transporting direction of the printing medium.

(Heat Treatment)

In the present invention, from the viewpoint of improving metallic luster of the resulting metal film as well as from the viewpoint of improving conductivity of the resulting metal film, after applying the aforementioned ink onto the printing medium, it is preferred that the obtained ink coating film on the printing medium is subjected to heat treatment.

By conducting such a heat treatment, it is possible to form a metal film that is capable of not only exhibiting metallic luster by subjecting the medium in the ink coating film to evaporation to dryness, but also further exhibiting conductivity by sintering the metal fine particles in the ink.

The method of conducting the heat treatment is not particularly limited. The heat treatment may be conducted by a method of applying a hot air to a surface of the ink coating film on the printing medium to heat the ink, a method of approaching a heater to the surface of the ink coating film on the printing medium to heat the ink, a method of bringing a heater into contact with a surface of the printing medium opposed to the surface of the printing medium on which the ink coating film is formed, to heat the ink, a method of heating the ink on the printing medium by steam curing using a high-temperature steam under an ordinary pressure or under a high pressure, or the like.

The temperature used upon the heat treatment is preferably lower than the temperature at which the printing medium suffers from deformation.

The heating treatment is conducted under ordinary pressures at a temperature of preferably not lower than 40° C., more preferably not lower than 50° C. and even more preferably not lower than 55° C., and also preferably not higher than 90° C., more preferably not higher than 80° C. and even more preferably not higher than 70° C., from the viewpoint of improving bending resistance of the resulting metal film. In this case, the heating treatment time is preferably not less than 1 minute, and is also preferably not more than 30 minutes, more preferably not more than 20 minutes, even more preferably not more than 10 minutes and further even more preferably not more than 5 minutes.

In addition, from the viewpoint of improving conductivity of the resulting metal film, the heating treatment temperature is preferably not lower than 130° C., more preferably not lower than 150° C. and even more preferably not lower than 170° C., and also preferably not higher than 300° C., more preferably not higher than 250° C. and even more preferably not higher than 230° C., and the heating treatment pressure is preferably not less than 3 kPa, more preferably not less than 5 kPa and even more preferably not less than 7 kPa, and is also preferably not more than 50 kPa, more preferably not more than 30 kPa and even more preferably not more than 10 kPa. In this case, the heating treatment time is preferably not less than 10 minutes, more preferably not less than 30 minutes and even more preferably not less than 50 minutes, and is also preferably not more than 6 hours, more preferably not more than 4 hours and even more preferably not more than 2 hours.

The thickness of the metal film is preferably not less than 0.1 μm, more preferably not less than 0.3 μm and even more preferably not less than 0.5 μm, and is also preferably not more than 5 μm, more preferably not more than 4 μm and even more preferably not more than 3 μm.

The volume resistivity of the metal film is preferably not more than $5 \times 10^{-5}$ Ω·cm, more preferably not more than $4 \times 10^{-5}$ Ω·cm, even more preferably not more than $3 \times 10^{-5}$ Ω·cm and further even more preferably not more than $2 \times 10^{-5}$ Ω·cm. From the viewpoint of facilitating production of the printed material, the volume resistivity of the metal film is preferably not less than $2 \times 10^{-6}$ Ω·cm, more preferably not less than $4 \times 10^{-6}$ Ω·cm and even more preferably not less than $6 \times 10^{-6}$ Ω·cm.

The aforementioned volume resistivity may be measured by the method described in Examples below.

The metal film formed from the aforementioned ink is capable of exhibiting high conductivity and therefore can be used as a conductive member for various electronic and electric equipments. The conductive member is preferably used in the applications including RFID tags; capacitors such as MLCC, etc.; electronic paper; image display apparatuses such as liquid crystal display, organic EL display, etc.; organic EL elements; organic transistors; circuit boards such as printed circuit board, flexible circuit board, etc.; organic solar cells; sensors such as flexible sensors, etc.; bonding agents such as solders, etc.; and the like. Among these applications, from the viewpoint of facilitated production of the metal film by an ink-jet printing method, the metal film is preferably used for RFID tags and MLCC.

[RFID Tag]

In the RFID tag of the present invention, the metal film formed from the aforementioned ink is preferably included as an antenna for RFID tag. The antenna for RFID tag may be produced by applying the aforementioned ink onto a substrate and sintering the metal fine particles contained in the ink.

As the substrate of the antenna for RFID tag, there may be mentioned the aforementioned printing medium.

Examples of the method of applying the aforementioned ink when forming the antenna for RFID tag therefrom include ink-jet printing, screen printing, flexographic printing, gravure printing, offset printing, dispenser printing, slot die coating, dip coating, spray coating, spin coating, doctor blading, knife edge coating, bar coating, and the like. Among these methods, from the viewpoint of facilitated formation of a pattern of the antenna, preferred is an ink-jet printing method. The printing conditions used in the ink jet printing method are the same as described previously.

The aforementioned RFID tag is manufactured by mounting a communication circuit such as a semiconductor chip, etc., to the aforementioned antenna for RFID tag and electrically connecting the antenna and the communication circuit to each other. More specifically, for example, after applying an anisotropic conductive adhesive (ACP), etc., to a mounting portion of the semiconductor chip on the antenna for RFID tag and arranging the semiconductor chip on the mounting portion, the semiconductor chip can be fixedly mounted to the antenna using a thermocompression bonding apparatus.

From the viewpoint of suppressing deterioration in conductivity of the antenna for RFID tag, the aforementioned RFID tag may also have such a structure that the antenna for RFID tag on which the semiconductor chip is mounted is sealingly enclosed by a resin film, a paper, etc., attached thereto through a bonding agent or an adhesive, or a coating formed by applying a resin thereonto.

Examples of the configuration of the RFID tag include those configurations constituted of the antenna for RFID tag and the communication circuit, such as an inlay type, a label type, a card type, a coin type, a stick type, and the like. The configuration of the RFID tag may be appropriately selected from these types, and the RFID tag may be processed into any suitable configuration, according to the use or applications thereof.

The shape and size of a pattern of the antenna for RFID tag may also be appropriately selected according to the use or applications thereof. In addition, the communication range of the RFID tag may be suitably selected according to the shape and size of the pattern of the antenna for RFID tag.

[Multi-Layer Ceramic Capacitor]

The multi layer ceramic capacitor (MLCC) of the present invention preferably includes the metal film formed from the aforementioned ink as an internal electrode layer thereof. Since the ink has a high content of the metal fine particles, it is possible to reduce a thickness of the internal electrode layer of the MLCC and therefore downsize the MLCC.

The aforementioned MLCC may be manufactured by first forming a multi-layer laminated sheet such that dielectric layers and the internal electrode layers formed from the aforementioned ink are alternately laminated on each other, and then baking the thus formed multi-layer laminated sheet to obtain a capacitor baked body as a main body of the capacitor.

The multi-layer laminated sheet may be produced by a printing method in which a ceramic slurry for forming the dielectric layer and the aforementioned ink were alternately printed in a laminated manner on a printing medium; a sheeting method in which a plurality of sheets each obtained by applying the aforementioned ink onto an unbaked ceramic green sheet formed from the ceramic slurry for forming the dielectric layer are prepared and laminated on each other so as to alternately arrange the dielectric layers and the internal electrode layers; or the like.

As the ceramic slurry for forming the dielectric layer, there may be used such a ceramic slurry that is prepared by adding an organic binder such as polyvinyl butyral, etc., and a solvent to a ceramic raw material powder such as barium titanate, etc.

The multi layer laminated sheet is cut into chips having a predetermined size and then subjected to heat treatment to remove organic substances such as polymers, etc., therefrom by combustion thereof, and thereafter the resulting product is baked in an atmosphere of a reducing gas to obtain the capacitor baked body.

The removal of the organic substances by combustion is preferably conducted, for example, at a temperature of not lower than 180° C. and not higher than 400° C. for a time period of not less than 0.5 hour and not more than 24 hours.

The baking of the multi-layer laminated sheet is preferably conducted, for example, at a temperature of not lower than 700° C. and not higher than 1400° C. for a time period of not less than 0.5 hour and not more than 8 hours.

A couple of external electrodes are formed at both ends of the resulting capacitor baked body, and the respective external electrodes are electrically connected to the respective internal electrode layers to obtain the MLCC.

The thickness of the internal electrode layer in the aforementioned MLCC is not particularly limited. However, the thickness of the internal electrode layer is preferably not more than 5 μm, more preferably not more than 3 μm and even more preferably not more than 1 μm from the viewpoint of reducing the thickness of the internal electrode layer and downsizing the MLCC, and is also preferably not less than 0.1 μm, more preferably not less than 0.3 μm and even more preferably not less than 0.5 μm from the viewpoint of facilitating production of the MLCC.

The thickness of the dielectric layer in the aforementioned MLCC is not particularly limited. However, the thickness of the dielectric layer is preferably not more than 5 μm, more preferably not more than 3 μm and even more preferably not more than 1 μm from the viewpoint of reducing the thickness of the dielectric layer and downsizing the MLCC, and is also preferably not less than 0.1 μm, more preferably not less than 0.3 μm and even more preferably not less than 0.5 μm from the viewpoint of facilitating production of the MLCC.

The thickness of each of the internal electrode layer and the dielectric layer may be measured using a scanning electron microscope (SEM).

EXAMPLES

In the following Preparation Examples, Examples and Comparative Examples, the "part(s)" and "%" indicate "part(s) by mass" and "% by mass", respectively, unless otherwise specified.

(1) Measurement of Number-Average Molecular Weight of Polymer B

The number-average molecular weight of the polymer B was measured by gel permeation chromatography [GPC apparatus: "HLC-8320GPC" available from Tosoh Corporation; columns: "TSKgel Super AWM-H", "TSKgel Super AW3000" and "TSKgel guardcolumn Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B(F-550, F-80, F-10, F-1, A-1000), PStQuick C(F-288, F-40, F-4, A-5000, A-500] all available from Tosoh Corporation as a reference standard substance.

As a sample to be measured, there was used a dispersion prepared by mixing 0.1 g of the polymer with 10 mL of the aforementioned eluent in a glass vial, stirring the resulting mixture at 25° C. for 10 hours with a magnetic stirrer, and then subjecting the mixture to filtration treatment through a syringe filter "DISMIC-13HP PTFE" (0.2 μm) available from Advantec Co., Ltd.

(2) Measurement of Acid Value of Polymer B

The acid value of the polymer B was measured by the same method as defined in JIS K 0070 except that only a mixed solvent of ethanol and an ether prescribed as a measuring solvent in JIS K 0070 was replaced with a mixed solvent containing acetone and toluene at a volume ratio [acetone:toluene] of 4:6.

(3) Measurement of Volume Median Particle Size ($D_{50}$) of Metal Oxide A

Using a laser diffraction/scattering-type particle size distribution measuring apparatus "LA-920" available from HORIBA Ltd., a cell for the measurement was charged with distilled water as a measuring solvent to measure a volume median particle size ($D_{50}$) of the metal oxide A in a sample to be measured at a concentration at which an absorbance thereof fell within an adequate range.

Incidentally, when conducting measurement for the below-mentioned pulverized silver nitrate AC1, n-hexane was used as the measuring solvent.

(4) Measurement of Cumulant Average Particle Size of Metal Fine Particles (a)

A sample to be measured was subjected to cumulant analysis using a laser particle analyzing system "ELS-8000" available from Otsuka Electrics Co., Ltd., to measure a cumulant average particle size of the metal fine particles (a). The measurement was conducted under the conditions including a temperature of 25° C., an angle between incident light and detector of 90° and a cumulative number of 100 times, and a refractive index of water (1.333) was input to the analyzing system as a refractive index of the dispersing medium. The concentration of the sample to be measured was controlled to $5 \times 10^{-3}\%$ in terms of a solid content thereof.

(5) Measurement of Solid Content of Metal Fine Particle Dispersion or Ink

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator adjusted to room temperature (25° C.) for 15 minutes, followed by measuring a mass thereof. The mass of the sample after removing the volatile components therefrom was defined as a mass of solids therein. The solid content of the sample was calculated by dividing the mass of the solids by the mass of the sample initially added.

(6) Calculation of Mass Ratio [Polymer B/(Polymer B+Metal)]

Using a freeze dryer "Model No.: FDU-2100" available from TOKYO RIKAKIKAI CO., LTD., equipped with a dry chamber "Model No.: DRC-1000" available from TOKYO RIKAKIKAI CO., LTD., the resulting metal fine particle dispersion or ink was freeze-dried under the drying conditions including operations of freezing at −25° C. for 1 hour, pressure reduction at −10° C. for 9 hours and pressure reduction at 25° C. for 5 hours, in which a vacuum degree used upon the pressure reduction was 5 Pa, thereby obtaining a dry metal powder containing the polymer B.

Using a differential thermogravimetric simultaneous measurement apparatus (TG/DTA) "STA7200RV" (tradename) available from Hitachi High-Tech Science Corporation, 10 mg of the dry metal powder as a sample to be measured was weighed in an aluminum pan cell, heated from 35° C. to 550° C. at a temperature rise rate of 10° C./min to measure a reduced mass of the sample under an air flow of 50 mL/min. The reduced mass of the sample as measured in a temperature range of from 35° C. to 550° C. was defined as a mass of the polymer B, and a mass of the residue at 550° C. was defined as a mass of the metal to calculate a mass ratio [polymer B/(polymer B+metal)].

(7) Calculation of Content of Metal (Metal Concentration) in Metal Fine Particle Dispersion or Ink The content of the metal (metal concentration) in the metal fine particle dispersion or the ink was calculated from the mass ratio [polymer B/(polymer B+metal)] obtained in the above item (6) and the solid content of the metal fine particle dispersion or the ink obtained in the above item (5).

(8) Measurement of Viscosity of Ink

The viscosity of the ink was measured at 32° C. using an E-type viscometer "Model No.: TV-25" (equipped with a standard cone rotor 1° 34'×R24; rotating speed: 50 rpm) available from Toki Sangyo Co., Ltd.

(9) Measurement of pH of Ink

The pH value of the ink was measured at 20° C. using a bench-top pH meter "F-71" available from Horiba Ltd., equipped with a pH electrode "6337-10D" available from Horiba Ltd.

Preparation of Pulverized Metal Oxide

Preparation Example 1

A dry beads mill (porcelain ball mill; diameter: 90 mm) available from AS ONE Corporation was charged with 50 g of silver oxide (guaranteed grade; $D_{50}$: 24 μm) available from FUJIFILM Wako Pure Chemical Corporation and 500 g of zirconia balls "TORAYCELAM" (diameter: 1 mm) available from AS ONE Corporation, and the contents of the beads mill were subjected to dry pulverization treatment at a rotating speed of 200 rpm for 2 hours, thereby obtaining pulverized silver oxide A1 ($D_{50}$: 5 μm) (hereinafter also referred to merely as "silver oxide A1"). The temperature within a cylindrical container (vessel) of the beads mill upon the pulverization treatment was controlled so as to fall within the range of not lower than 20° C. and not higher than 35° C.

Preparation Example 2

The same procedure as in Preparation Example 1 was repeated except that the pulverization time was changed to 24 hours, thereby obtaining pulverized silver oxide A2 ($D_{50}$: 0.5 μm) (hereinafter also referred to merely as "silver oxide A2").

Preparation Example 3

The same procedure as in Preparation Example 1 was repeated except that the pulverization time was changed to 0.5 hour, thereby obtaining pulverized silver oxide A3 ($D_{50}$: 15 μm) (hereinafter also referred to merely as "silver oxide A3").

Preparation Example 4

The same procedure as in Preparation Example 1 was repeated except that the silver oxide was replaced with gold (III) oxide (guaranteed grade; $D_{50}$: 22 μm) available from FUJIFILM Wako Pure Chemical Corporation, thereby obtaining pulverized gold oxide A4 ($D_{50}$: 5 μm) (hereinafter also referred to merely as "gold oxide A4").

Preparation Example 5

The same procedure as in Preparation Example 1 was repeated except that the silver oxide was replaced with palladium (II) oxide (guaranteed grade; $D_{50}$: 31 μm) available from FUJIFILM Wako Pure Chemical Corporation, thereby obtaining pulverized palladium oxide A5 ($D_{50}$: 5 μm) (hereinafter also referred to merely as "palladium oxide A5").

Preparation Example 6

The same procedure as in Preparation Example 1 was repeated except that the silver oxide was replaced with silver nitrate (guaranteed grade) available from FUJIFILM Wako Pure Chemical Corporation, thereby obtaining pulverized silver nitrate AC1 ($D_{50}$: 5 μm) (hereinafter also referred to merely as "silver nitrate AC1").

Production of Metal Fine Particle Dispersion

Example 1-1

A 100 mL eggplant-shaped flask was charged with 10 g of the silver oxide A1 as the oxide A, 0.8 g of a styrene/α-methyl styrene/acrylic acid/maleic acid/alkoxy (polyethylene glycol/polypropylene glycol) acrylate (number of alkyleneoxide units: 32 mol; molar ratio [EP/PO]=75/25) copolymer [in the form of an absolute dry product (number-average molecular weight: 4,500; acid value: 24 mgKOH/g) of an aqueous solution of the copolymer having a solid content of 40% "DISPERBYK-2015" (tradename; acid value: 10 mgKOH/g) available from BYK Chemie GmbH] as the polymer B (the absolute dry product is hereinafter also referred to merely as "BYK-2015dry"), 30 g of propylene glycol (guaranteed grade; hereinafter also referred to merely as "PG") available from FUJIFILM Wako Pure Chemical Corporation as the compound C, and 4 g of a 25% aqueous ammonia solution as the complexing agent D, and the contents of the flask were stirred at an ordinary temperature for 0.5 hour with a magnetic stirrer. Thereafter, the flask was dipped in a water bath at 40° C. so as to control an inside temperature of the flask to 40° C. After the inside temperature of the flask reached 40° C., the contents of the flask were stirred for 1 hour, and then air-cooled, thereby obtaining a dark brown metal fine particle dispersion D1. The mass ratio [polymer B/(polymer B+metal)] as well as the metal concentration were measured and calculated, and the cumulant average particle size of the metal fine particles in the dispersion was measured, by the aforementioned methods. The results are shown in Table 3.

Examples 1-2 to 1-5

The same procedure as in Example 1-1 was repeated except that the complexing agent D was changed to those shown in Table 1, thereby obtaining metal fine particle dispersions D2 to D5.

Examples 1-6 and 1-7

The same procedure as in Example 1-1 was repeated except that the oxide A was changed to the silver oxide A2 and the silver oxide A3, respectively, as shown in Table 1, thereby obtaining metal fine particle dispersions D6 and D7.

Example 1-8

The same procedure as in Example 1-1 was repeated except that the amount of the propylene glycol (PG) as the compound C was changed to 0.9 g, and 29.1 g of ethylene glycol (guaranteed grade; hereinafter also referred to merely as "EG") available from FUJIFILM Wako Pure Chemical Corporation was further mixed such that a mass ratio of PG to EG mixed [PG/EG] was 3/97, thereby obtaining a metal fine particle dispersion D8.

Example 1-9

The same procedure as in Example 1-1 was repeated except that the amount of the silver oxide A1 as the oxide A was changed to 5 g, thereby obtaining a metal fine particle dispersion D9.

Examples 1-10 and 1-11

The same procedure as in Example 1-1 was repeated except that the temperature used upon mixing the respective components was changed to those shown in Table 1, thereby obtaining metal fine particle dispersions D10 and D11.

Examples 1-12 and 1-13

The same procedure as in Example 1-1 was repeated except that the oxide A was changed to the gold oxide A4 and the palladium oxide A5, respectively, as shown in Table 1, thereby obtaining metal fine particle dispersions D12 and D13.

Example 1-14

The same procedure as in Example 1-1 was repeated except that the compound C was changed to dipropylene glycol (isomer mixture) available from Tokyo Chemical Industry Co., Ltd., thereby obtaining a metal line particle dispersion D14.

Examples 1-15 and 1-16

The same procedure as in Example 1-1 was repeated except that the polymer B was changed to polyacrylic acid "POLYACRYLIC ACID" (tradename; Mw: 5,000) available from FUJIFILM Wako Pure Chemical Corporation (hereinafter also referred to merely as "PAA") and polyvinyl alcohol "POLYVINYL ALCOHOL" (tradename; Mw: 1,500) available from FUJIFILM Wako Pure Chemical Corporation (hereinafter also referred to merely as "PVA"), respectively, thereby obtaining metal fine particle dispersions D15 and D16.

Examples 1-17 to 1-20

The same procedure as in Example 1-1 was repeated except that the amount of the propylene glycol (PG) as the compound C was changed to those amounts shown in Table 1, thereby obtaining metal fine particle dispersions D17 to D20.

Comparative Example 1-1

The same procedure as in Example 1-1 was repeated except that the amount of "BYK-2015dry" was changed to 0.5 g, thereby obtaining a metal fine particle dispersion DC1.

Comparative Example 1-2

The same procedure as in Example 1-1 was repeated except that the oxide A was replaced with the silver nitrate AC1, thereby obtaining a metal fine particle dispersion DC2.

Comparative Example 1-3

The same procedure as in Example 1-1 was repeated except that ethylene glycol (EG) was used in place of the compound C, thereby obtaining a metal fine particle dispersion DC3.

Comparative Example 1-4

The same procedure as in Example 1-1 was repeated except that "BYK-2015dry" as the dispersant was changed to citric acid, thereby obtaining a metal fine particle dispersion DC4.

Comparative Example 1-5

The same procedure as in Example 1-1 was repeated except that 1-methoxy-2-propanol was used in place of the compound C, thereby obtaining a metal fine particle dispersion DC5.

TABLE 1

| | Metal oxide A | | | Polymer B | | Compound C | |
|---|---|---|---|---|---|---|---|
| | Kind | D50 (μm) | Amount charged (g) | Kind | Amount charged (g) | Kind | Amount charged (g) |
| Example 1-1 | Silver oxide A1 | 5 | 10 | BYK-2015dry | 0.8 | PG | 30 |
| Example 1-2 | Silver oxide A1 | 5 | 10 | BYK-2015dry | 0.8 | PG | 30 |
| Example 1-3 | Silver oxide A1 | 5 | 10 | BYK-2015dry | 0.8 | PG | 30 |
| Example 1-4 | Silver oxide A1 | 5 | 10 | BYK-2015dry | 0.8 | PG | 30 |
| Example 1-5 | Silver oxide A1 | 5 | 10 | BYK-2015dry | 0.8 | PG | 30 |
| Example 1-6 | Silver oxide A2 | 0.5 | 10 | BYK-2015dry | 0.8 | PG | 30 |
| Example 1-7 | Silver oxide A3 | 15 | 10 | BYK-2015dry | 0.8 | PG | 30 |
| Example 1-8 | Silver oxide A1 | 5 | 10 | BYK-2015dry | 0.8 | PG (EG) | 0.9 (29.1) |
| Example 1-9 | Silver oxide A1 | 5 | 5 | BYK-2015dry | 0.4 | PG | 30 |
| Example 1-10 | Silver oxide A1 | 5 | 10 | BYK-2015dry | 0.8 | PG | 30 |
| Example 1-11 | Silver oxide A1 | 5 | 10 | BYK-2015dry | 0.8 | PG | 30 |
| Example 1-12 | Gold oxide A4 | 5 | 10 | BYK-2015dry | 0.8 | PG | 30 |
| Example 1-13 | Palladium oxide A5 | 5 | 10 | BYK-2015dry | 0.8 | PG | 30 |
| Example 1-14 | Silver oxide A1 | 5 | 10 | BYK-2015dry | 0.8 | Dipropylene glycol | 30 |
| Example 1-15 | Silver oxide A1 | 5 | 10 | PAA | 0.8 | PG | 30 |
| Example 1-16 | Silver oxide A1 | 5 | 10 | PVA | 0.8 | PG | 30 |
| Example 1-17 | Silver oxide A1 | 5 | 10 | BYK-2015dry | 0.8 | PG | 50 |
| Example 1-18 | Silver oxide A1 | 5 | 10 | BYK-2015dry | 0.8 | PG | 100 |
| Example 1-19 | Silver oxide A1 | 5 | 10 | BYK-2015dry | 0.8 | PG | 15 |
| Example 1-20 | Silver oxide A1 | 5 | 10 | BYK-2015dry | 0.8 | PG | 5 |

| | Complexing agent D | | Mass ratio | Mass ratio | |
|---|---|---|---|---|---|
| | Kind | Amount charged (g) | Mass ratio [compound C/ oxide A] | [complexing agent D/ oxide A] | Mixing temperature (° C.) |
| Example 1-1 | 25% $NH_3$ (aq) | 4 | 3.00 | 0.10 | 40 |
| Example 1-2 | | 0 | 3.00 | 0 | 40 |
| Example 1-3 | 25% $NH_3$ (aq) | 2 | 3.00 | 0.05 | 40 |
| Example 1-4 | 25% $NH_3$ (aq) | 14 | 3.00 | 0.35 | 40 |
| Example 1-5 | 3-Mercaptopropionic acid | 4 | 3.00 | 0.10 | 40 |
| Example 1-6 | 25% $NH_3$ (aq) | 4 | 3.00 | 0.10 | 40 |
| Example 1-7 | 25% $NH_3$ (aq) | 4 | 3.00 | 0.10 | 40 |
| Example 1-8 | 25% $NH_3$ (aq) | 4 | 0.09 | 0.10 | 40 |
| Example 1-9 | 25% $NH_3$ (aq) | 4 | 6.00 | 0.20 | 40 |
| Example 1-10 | 25% $NH_3$ (aq) | 4 | 3.00 | 0.10 | 25 |
| Example 1-11 | 25% $NH_3$ (aq) | 4 | 3.00 | 0.10 | 95 |
| Example 1-12 | 25% $NH_3$ (aq) | 4 | 3.00 | 0.10 | 40 |
| Example 1-13 | 25% $NH_3$ (aq) | 4 | 3.00 | 0.10 | 40 |
| Example 1-14 | 25% $NH_3$ (aq) | 4 | 3.00 | 0.10 | 40 |
| Example 1-15 | 25% $NH_3$ (aq) | 4 | 3.00 | 0.10 | 40 |
| Example 1-16 | 25% $NH_3$ (aq) | 4 | 3.00 | 0.10 | 40 |
| Example 1-17 | 25% $NH_3$ (aq) | 4 | 5.00 | 0.10 | 40 |
| Example 1-18 | 25% $NH_3$ (aq) | 4 | 10.00 | 0.10 | 40 |
| Example 1-19 | 25% $NH_3$ (aq) | 4 | 1.50 | 0.10 | 40 |
| Example 1-20 | 25% $NH_3$ (aq) | 4 | 0.50 | 0.10 | 40 |

TABLE 2

| | Metal oxide A | | | Polymer B | | Compound C | |
|---|---|---|---|---|---|---|---|
| | Kind | D50 (μm) | Amount charged (g) | Kind | Amount charged (g) | Kind | Amount charged (g) |
| Comparative Example 1-1 | Silver oxide A1 | 5 | 10 | BYK-2015dry | 0.5 | PG | 30 |
| Comparative Example 1-2 | Silver nitrate AC1 | 5 | 10 | BYK-2015dry | 0.8 | PG | 30 |
| Comparative Example 1-3 | Silver oxide A1 | 5 | 10 | BYK-2015dry | 0.8 | (EG) | (30) |
| Comparative Example 1-4 | Silver oxide A1 | 5 | 10 | (Citric acid) | (0.8) | PG | 30 |
| Comparative Example 1-5 | Silver oxide A1 | 5 | 10 | BYK-2015dry | 0.8 | — | 0 |

| | Complexing agent D | | Mass ratio [compound C/ oxide A] | Mass ratio [complexing agent D/ oxide A] | Mixing temperature (° C.) |
|---|---|---|---|---|---|
| | Kind | Amount charged (g) | | | |
| Comparative Example 1-1 | 25% $NH_3$ (aq) | 4 | 3.00 | 0.10 | 40 |
| Comparative Example 1-2 | 25% $NH_3$ (aq) | 4 | 3.00 | 0.10 | 40 |
| Comparative Example 1-3 | 25% $NH_3$ (aq) | 4 | — | 0.10 | 40 |
| Comparative Example 1-4 | 25% $NH_3$ (aq) | 4 | 3.00 | 0.10 | 40 |
| Comparative Example 1-5 | 25% $NH_3$ (aq) | 4 | — | 0.10 | 40 |

<Measurement of Volume Fraction of Metal Fine Particles (a) Having Particle Size of not More than 100 nm>

Using a software attached to the aforementioned laser particle analyzing system, a volume fraction of the metal fine particles (a) having a particle size of not more than 100 nm was determined from the cumulant average particle size obtained by the aforementioned measurement. The results are shown in Table 3. It is indicated that as the numerical value of the volume fraction is increased, the amount of coarse particles contained in the metal fine particles is reduced, and the content of the metal fine particles having a particle size of not more than 100 nm becomes higher.

TABLE 3

| | Metal fine particle dispersion | | | |
|---|---|---|---|---|
| | No. | Mass ratio [polymer B/ (polymer B + metal)]*1 | Metal concentration (% by mass)*2 | Cumulant average particle size (nm) | Volume fraction (%) of metal fine particles (a) having particle size of not more than 100 nm |
| Example 1-1 | D1 | 0.11 | 21 | 21 | 99 |
| Example 1-2 | D2 | 0.11 | 22 | 42 | 62 |
| Example 1-3 | D3 | 0.11 | 22 | 33 | 71 |
| Example 1-4 | D4 | 0.11 | 17 | 29 | 68 |
| Example 1-5 | D5 | 0.11 | 21 | 24 | 83 |
| Example 1-6 | D6 | 0.11 | 21 | 31 | 89 |
| Example 1-7 | D7 | 0.12 | 21 | 34 | 77 |
| Example 1-8 | D8 | 0.11 | 21 | 28 | 82 |
| Example 1-9 | D9 | 0.21 | 12 | 22 | 79 |
| Example 1-10 | D10 | 0.11 | 21 | 24 | 92 |
| Example 1-11 | D11 | 0.11 | 21 | 31 | 81 |
| Example 1-12 | D12 | 0.11 | 20 | 23 | 95 |
| Example 1-13 | D13 | 0.11 | 18 | 22 | 92 |
| Example 1-14 | D14 | 0.11 | 21 | 33 | 86 |
| Example 1-15 | D15 | 0.11 | 21 | 31 | 77 |
| Example 1-16 | D16 | 0.12 | 21 | 37 | 71 |
| Example 1-17 | D17 | 0.11 | 21 | 23 | 97 |
| Example 1-18 | D18 | 0.11 | 21 | 29 | 91 |
| Example 1-19 | D19 | 0.11 | 21 | 19 | 99 |
| Example 1-20 | D20 | 0.11 | 21 | 21 | 94 |
| Comparative Example 1-1 | DC1 | 0.10 | 21 | 57 | 21 |

TABLE 3-continued

| | No. | Mass ratio [polymer B/ (polymer B + metal)]*[1] | Metal concentration (% by mass)*[2] | Cumulant average particle size (nm) | Volume fraction (%) of metal fine particles (a) having particle size of not more than 100 nm |
|---|---|---|---|---|---|
| | | Metal fine particle dispersion | | | |
| Comparative Example 1-2 | DC2 | 0.11 | 13 | 45 | 35 |
| Comparative Example 1-3 | DC3 | 0.11 | 21 | 103 | 11 |
| Comparative Example 1-4 | DC4 | 0.11 | 21 | 47 | 17 |
| Comparative Example 1-5 | DC5 | 0.12 | 21 | 82 | 16 |

Note
*[1] Mass ratio [polymer B/(polymer B + metal)] in metal fine particle dispersion;
*[2] Metal concentration (% by mass) in metal fine particle dispersion From the results shown in Table 3, it was confirmed that the metal fine particle dispersions obtained in Examples 1-1 to 1-20 had a high volume fraction of the metal fine particles (a) having a particle size of not more than 100 nm, and were therefore prevented from undergoing formation of coarse metal fine particles having a particle size of more than 100 nm, as compared to those metal fine particle dispersions obtained in Comparative Examples 1-1 to 1-5.

Production of Inks and Preparation of Printed Materials, as Well as Evaluation Thereof Production of Inks Example 2-1

The metal fine particle dispersion D1 obtained in Example 1-1 was compounded such that a whole amount of the resulting ink was 30 g, and contents of the metal and propylene glycol in the ink were 10% and 36%, respectively. The dispersion was further mixed with the below-mentioned components such that a content of a polyether-modified silicone surfactant "KF6011" (tradename; PEG-11 methyl ether dimethicone) available from Shin Etsu Chemical Co., Ltd., in the resulting mixture was 1.0%, a content of an acetylene glycol-based surfactant "SURFYNOL 104" (tradename; 2,4,7,9-tetramethyl-5-decyne-4,7-diol; active ingredient content: 100%) available from Evonik Industries AG was 0.5%, and the balance was ion-exchanged water, thereby preparing an ink.

Meanwhile, the aforementioned preparation procedure was conducted by charging the respective components into a 50 mL glass vial while stirring with a magnetic stirrer. Thereafter, the resulting mixture was subjected to filtration treatment using a 25 mL-capacity needleless syringe available from Terumo Corporation fitted with a 5 μm-pore size membrane filter "Minisart" (tradename) available from Sartorius Inc., thereby obtaining the ink. It was confirmed that the viscosity of the ink was 5.1 mPa·s, and the pH value of the ink was 8.1.

Examples 2-2 to 2-20 and Comparative Examples 2-1 to 2-5

The same procedure as in Example 2-1 was repeated except that the metal fine particle dispersion D1 used in Example 2-1 was replaced with each of the metal fine particle dispersions D2 to D20 and DC1 to DC5 obtained in Examples 1-2 to 1-20 and Comparative Examples 1-1 to 1-5, respectively, thereby obtaining respective inks.

Using the respective inks obtained above, printing was conducted by the method using the following printing conditions, and the metal film formed on a printing medium was evaluated for bending resistance and conductivity thereof by the following methods.

(Preparation of Printed Material for Evaluation of Bending Resistance by Ink-Jet Printing)

Under the environmental conditions of a temperature of 25±1° C. and a relative humidity of 30±5%, the respective inks were loaded into an ink-jet print evaluation apparatus available from Trytech Co., Ltd., equipped with an ink-jet print head "KJ4B-QA06NTB-STDV" (piezoelectric type; number of nozzles: 2,656) available from Kyocera Corporation.

The operating conditions of the print evaluation apparatus and the print head were set to a head applied voltage of 26 V, a head drive frequency of 20 kHz, an ejected ink droplet amount of 18 pL, a head temperature of 32° C., a resolution of 600 dpi, the number of ink shots for flushing before being ejected of 200 shots and a negative pressure of −4.0 kPa, and the printing medium was fixed on a transportation table under reduced pressure such that the longitudinal direction of the printing medium was aligned with a transportation direction thereof. A printing command was transmitted to the aforementioned print evaluation apparatus to eject and adhere the ink onto the printing medium at Duty 100%, and then heat and dry the ink on the printing medium on a hot plate at 60° C. for 2 minutes, thereby obtaining a printed material for evaluation on which the metal film was formed.

Meanwhile, as the printing medium, there was used a polyester film "LUMIRROR T60" having a size of 300 mm in length and 297 mm in width (thickness: 75 μm; water absorption: 2.3 g/m$^2$) available from Toray Industries Inc.

[Evaluation of Bending Resistance]

The printed material for evaluation obtained above was folded 180° such that the printed surface was faced inward, and the longitudinal edges or lateral edges of the printed material were overlapped on each other. Next, a 200 g weight of a rectangular parallelopiped shape (bottom surface area: 4 cm$^2$) was placed on the printed material such that a central portion of the weight was aligned with a central portion of a crease of the folded printed material, and the weight was pressed against the printed material for 30 seconds while applying a load of 50 g/cm² thereto, followed by opening the printed material. The broken portion of the metal film was wiped off with a soft cloth, and the maximum value of a width (mm) of the broken portion of the metal film was defined as an index of bending resistance of the metal film. As the maximum value of a width (mm) of the broken portion of the metal film is reduced, the bending resistance of the metal film becomes more excellent. The results are shown in Table 4.

TABLE 4

| | Ink No. of metal fine particle dispersion | Evaluation Bending resistance (maximum value of width of broken portion of metal film (mm)) |
|---|---|---|
| Example 2-1 | D1 | 0 |
| Example 2-2 | D2 | 2 |
| Example 2-3 | D3 | 0 |
| Example 2-4 | D4 | 1 |
| Example 2-5 | D5 | 0 |
| Example 2-6 | D6 | 0 |
| Example 2-7 | D7 | 1 |
| Example 2-8 | D8 | 0 |
| Example 2-9 | D9 | 1 |
| Example 2-10 | D10 | 0 |
| Example 2-11 | D11 | 0 |
| Example 2-12 | D12 | 0 |
| Example 2-13 | D13 | 0 |
| Example 2-14 | D14 | 0 |
| Example 2-15 | D15 | 1 |
| Example 2-16 | D16 | 1 |
| Example 2-17 | D17 | 0 |
| Example 2-18 | D18 | 0 |
| Example 2-19 | D19 | 0 |
| Example 2-20 | D20 | 0 |
| Comparative Example 2-1 | DC1 | 6 |
| Comparative Example 2-2 | DC2 | 5 |
| Comparative Example 2-3 | DC3 | 8 |
| Comparative Example 2-4 | DC4 | 5 |
| Comparative Example 2-5 | DC5 | 7 |

From the results shown in Table 4, it was confirmed that the inks obtained in Examples 2-1 to 2-20 were capable of forming the metal films that were excellent in bending resistance, as compared to the inks obtained in Comparative Examples 2-1 to 2-5.

(Preparation of Printed Material for Evaluation of Conductivity by Ink-Jet Printing)

Using the ink obtained in Example 2-1, the same procedure as described in the aforementioned paragraph "Preparation of Printed Material for Evaluation of Bending Resistance" was repeated under the same printing conditions as used therein except that the printing medium was changed to a polyethylene naphthalate (PEN) film "TEONEX Q51-A4" (210 mm in length×297 mm in width; thickness: 25 μm) available from Teijin Film Solutions Ltd., thereby forming an ink coating film as a solid image on the printing medium. Thereafter, the ink coating film was heated under the conditions including a temperature of 190° C. and a pressure of 8 kPa for 1 hour using a vacuum dryer "AVO-200NB" available from AS ONE Corporation to form a metal film, thereby obtaining a printed material 1 for evaluation of conductivity.

[Evaluation of Conductivity]

Using the printed material for evaluation of conductivity obtained above, the volume resistivity of the metal film formed thereon was measured by the following method to evaluate conductivity of the metal film.

Using the printed material for evaluation of conductivity obtained above, an ASP probe was connected to a low-resistance resistivity meter "Loresta-GP MCP-T610" available from Mitsubishi Chemical Analytech Co., Ltd., and the resistance values of the metal film of the printed material were measured at 10 positions thereof by the 4-terminal 4-point probe method according to JIS K7194 "TESTING METHOD FOR RESISTIVITY OF CONDUCTIVE PLASTICS WITH A FOUR-POINT PROBE ARRAY", and the average value of the thus measured resistance values was defined as the volume resistivity of the metal film.

Incidentally, the thickness of the metal film used for measurement of the volume resistivity was measured by observing a section of the metal film cut by a stainless steel razor (76 razor for ordinary use; blade thickness: 76 μm) available from FEATHER Safety Razor Co., Ltd., using a scanning electron microscope (SEM) "S-4800" (device name) available from Hitachi Ltd., and the thus measured thickness was input to the resistivity meter.

The printed material 1 for evaluation of conductivity had a volume resistivity of $1.7 \times 10^{-5}$ (Ω·cm), and therefore exhibited sufficient conductivity.

<Manufacture of RFID Tag>

(Production of Antenna for RFID Tag by Ink-Jet Printing)

Using the ink obtained in Example 2-1, the same procedure as described in the aforementioned paragraph "Preparation of Printed Material for Evaluation of Bending Resistance" was repeated under the same printing conditions as used therein except that the printing medium was replaced with the aforementioned PEN film (210 mm in length×297 mm in width; thickness: 25 μm), thereby forming an antenna pattern (outer contour size: 95 mm×8 mm) acting as an antenna for RFID tag in the UHF band. Thereafter, the antenna pattern was heated under the conditions including a temperature of 190° C. and a pressure of 8 kPa using the aforementioned vacuum dryer, thereby an antenna 1 for RFID tag.

(Surface Mounting of Communication Circuit)

A semiconductor chip for RFID in the UHF band "Alien-Higgs 3" available from Alien Technology Corporation was mounted on the antenna 1 for RFID tag obtained above using a conductive paste "TK Paste CR-2800" (tradename) available from KAKEN Tech Co., Ltd., thereby producing an RFID tag 1. Furthermore, 100 RFID tags 1 in total were produced in the same manner as described above.

[Evaluation of RFID in UHF Band]

Using a UHF band RFID reader/writer main body "DOTR-2100" available from Tohoku Systems Support Co., Ltd., and a software "RFID-BOX" available from Tohoku Systems Support Co., Ltd., RFID communication was conducted at a communication distance of 20 cm to execute write-in and read-out of data. The 100 RFID tags 1 produced above were subjected to the aforementioned RFID communication test. As a result, it was confirmed that all of the 100 RFID tags 1 were communicatable, and therefore the fraction defective of the RFID tags was 0%.

<Manufacture of MLCC>

(Preparation of Ceramic Slurry for Formation of Dielectric Layer)

A porcelain ball mill (outer diameter: 120 mm; capacity: 900 mL) available from Nitto Kagaku Co., Ltd., was charged with materials for formation of a dielectric layer including 100 parts of barium titanate (guaranteed grade) available from FUJIFILM Wako Pure Chemical Corporation, 7 parts of polyvinyl butyral "S-LEC BM-2" (tradename) available from Sekisui Chemical Co., Ltd., 3 parts of dioctyl phthalate (guaranteed grade) available from Tokyo Chemical Industry Co., Ltd., 30 parts of methyl ethyl ketone (guaranteed grade) available from FUJIFILM Wako Pure Chemical Corporation, 20 parts of ethanol (guaranteed grade) available from FUJIFILM Wako Pure Chemical Corporation and 20 parts of toluene (guaranteed grade) available from FUJIFILM Wako Pure Chemical Corporation together with 600 parts of zirconia beads "Model No.: YTZ-1" available from Nikkato Corporation, and the contents of the ball mill were mixed with each other at 200 rpm for 20 hours, thereby obtaining a ceramic slurry 1 for formation of a dielectric layer.

(Preparation of Multi-Layer Laminated Sheet by Ink-Jet Printing)

Using the ceramic slurry 1 for formation of a dielectric layer and the ink obtained in Example 2-1 as an ink for formation of an internal electrode layer, the same procedure as described in the aforementioned paragraph "Preparation of Printed Material for Evaluation of Bending Resistance" was repeated under the same printing conditions as used therein except that the printing medium was replaced with the aforementioned PEN film (210 mm in length×297 mm in width; thickness: 25 μm) to conduct printing so as to alternately laminate the dielectric layers and the internal electrode layers on the printing medium, followed by releasing the printing medium from the resulting laminate, thereby obtaining a multi-layer laminated sheet 1. The number of the layers in the multi-layer laminated sheet 1 was 256 as a total number of the dielectric layers and the internal electrode layers laminated.

(Manufacture of MLCC)

The thus obtained multi-layer laminated sheet 1 was placed in a small-scale box furnace "Model No.: KBF333N1" available from Koyo Thermo Systems Co., Ltd., and subjected to heat treatment at 190° C. for 1 minute to dry the sheet and remove the solvent therefrom.

Next, the thus heat-treated multi-layer laminated sheet 1 was cut along a predetermined cutting line by dicing and formed into a chip shape (size: 32 mm×16 mm). The thus cut chips were heated in the small-scale box furnace in an $N_2$ atmosphere at 350° C. for 3 hours to burn and remove organic substances such as polymers, etc., therefrom, and then baked in the small-scale box furnace in a reducing gas atmosphere at 900° C. for 2 hours, thereby obtaining a capacitor baked body 1 as a capacitor main body.

Then, a glass frit-containing silver paste "Model No.: TDPAG-TS1002-80" available from AS ONE Corporation was applied to both end surfaces of the capacitor baked body 1, and further burned in the small-scale box furnace in an $N_2$ atmosphere at 800° C. to form external electrodes, thereby obtaining MLCC 1 in which the external electrodes were electrically connected to the internal electrode layers.

[Evaluation of MLCC by Observation]

The section of the MLCC1 was observed by the aforementioned SEM to evaluate the condition of lamination of the dielectric layers and the internal electrode layers. The thickness of each of the dielectric layers and the internal electrode layers was 0.6 μm, and there were no variation between the thicknesses of the respective layers when observed at 50 positions thereof, so that it was confirmed that the resulting MLCC 1 had a high thickness accuracy.

INDUSTRIAL APPLICABILITY

According to the present invention, it is possible to obtain a metal fine particle dispersion having a high content of metal fine particles having a particle size of not more than 100 nm. In addition, according to the present invention, when using an ink containing the metal fine particle dispersion, it is possible to obtain a printed material on which a metal film that is excellent in bending resistance and capable of exhibiting a high conductivity is formed. For this reason, the metal fine particle dispersion and the ink containing the metal fine particle dispersion can be suitably used in various application fields.

The invention claimed is:

1. A process for producing a metal fine particle dispersion comprising metal fine particles (a) dispersed with a polymer B, the process comprising a step 1 of mixing a metal oxide A, the polymer B, a compound C, and a complexing agent D with each other, in which:
   the polymer B comprises a hydrophilic group;
   the compound C is a dihydric alcohol represented by the following general formula (1); and
   the metal fine particles (a) have a cumulant average particle size of not more than 50 nm.

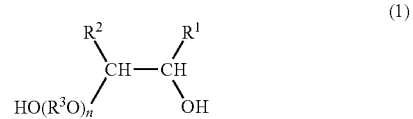

wherein $R^1$ and $R^2$ are independently a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), in the case where both $R^1$ and $R^2$ are a hydrogen atom, $R^3$ comprises at least a propylene group, and n is not less than 1,
wherein a volume median particle size $D_{50}$ of the metal oxide A is not less than 0.1 μm and not more than 15 μm,
wherein the polymer B is a vinyl-based polymer that comprises a constitutional unit derived from a (meth) acrylic acid or maleic acid monomer (b-1), a constitutional unit derived from a styrene-based monomer (b-2), and a constitutional unit derived from an alkoxy polyalkylene glycol (meth) acrylate monomer (b-3),
wherein a number-average molecular weight of the polymer B is not less than 3,000 and not more than 7,000,
wherein an acid value of the polymer B is not less than 20 mgKOH/g and not more than 30 mgKOH/g,
wherein a mass ratio of the compound C to the metal oxide A [compound C/metal oxide A] is not less than 0.05 and not more than 5, and
a mass ratio of the complexing agent D to the metal oxide A [complexing agent D/metal oxide A] is not less than 0.05 and not more than 0.3.

2. The process for producing a metal fine particle dispersion according to claim 1, wherein the mass ratio of the complexing agent D to the metal oxide A [complexing agent D/metal oxide A] is not less than 0.05 and not more than 0.2.

3. The process for producing a metal fine particle dispersion according to claim 1, wherein the complexing agent D is at least one compound selected from the group consisting of ammonia and mercaptocarboxylic acids.

4. The process for producing a metal fine particle dispersion according to claim 1, wherein the mixing in the step 1 is conducted at a temperature of not lower than 20° C. and not higher than 100° C.

5. The process for producing a metal fine particle dispersion according to claim 1, wherein the metal oxide A is at least one metal oxide selected from the group consisting of gold oxide, silver oxide, copper oxide, and palladium oxide.

6. The process for producing a metal fine particle dispersion according to claim 1, wherein the compound C is at least one compound selected from the group consisting of propylene glycol and polypropylene glycols having a polymerization degree of not less than 2 and not more than 20.

7. The process for producing a metal fine particle dispersion according to claim 1, wherein the polymer B is an anionic polymer having an anionic group, and the anionic group of the anionic polymer is a carboxy group.

8. The process for producing a metal fine particle dispersion according to claim 1, wherein the cumulant average particle size of the metal fine particles (a) in the metal fine particle dispersion is not less than 2 nm.

9. The process for producing a metal fine particle dispersion according to claim 1, wherein a volume fraction of the metal fine particles having a particle size of not more than 100 nm is more than 91%.

10. The process for producing a metal fine particle dispersion according to claim 1, wherein a mass ratio of the polymer B to a sum of the polymer B and the metal [polymer B/(polymer B+metal)] in the metal fine particle dispersion obtained is not less than 0.005 and not more than 0.3.

11. The process for producing a metal fine particle dispersion according to claim 10, wherein the mass ratio of the polymer B to the sum of the polymer B and the metal [polymer B/(polymer B+metal)] in the metal fine particle dispersion obtained is not less than 0.05 and not more than 0.2.

12. The process for producing a metal fine particle dispersion according to claim 1, wherein the amount of the oxide A charged on the basis of a total amount of the oxide A, the polymer B and the compound C charged is not less than 5% by mass and not more than 70% by mass.

13. The process for producing a metal fine particle dispersion according to claim 12, wherein the amount of the oxide A charged on the basis of a total amount of the oxide A, the polymer B and the compound C charged is not less than 15% by mass and not more than 30% by mass.

* * * * *